United States Patent
Du

(10) Patent No.: US 10,582,431 B2
(45) Date of Patent: Mar. 3, 2020

(54) CELLULAR NETWORK RELOCATION METHOD AND BASE STATION

(71) Applicant: ZTE Corporation, Shenzhen, Guangdong (CN)

(72) Inventor: Zhongda Du, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 184 days.

(21) Appl. No.: 15/572,309

(22) PCT Filed: Sep. 22, 2015

(86) PCT No.: PCT/CN2015/090283
§ 371 (c)(1),
(2) Date: Nov. 7, 2017

(87) PCT Pub. No.: WO2016/176952
PCT Pub. Date: Nov. 10, 2016

(65) Prior Publication Data
US 2018/0132150 A1 May 10, 2018

(30) Foreign Application Priority Data

May 7, 2015 (CN) .......................... 2015 1 0229559

(51) Int. Cl.
*H04W 36/08* (2009.01)
*H04W 36/00* (2009.01)
*H04W 36/18* (2009.01)

(52) U.S. Cl.
CPC ....... *H04W 36/08* (2013.01); *H04W 36/0033* (2013.01); *H04W 36/18* (2013.01); *H04W 36/0069* (2018.08)

(58) Field of Classification Search
CPC .. H04W 36/08; H04W 36/18; H04W 36/0033
See application file for complete search history.

(56) References Cited

U.S. PATENT DOCUMENTS

| | | |
|---|---|---|
| 7,995,534 B2 | 8/2011 | Flore |
| 2008/0181177 A1 | 7/2008 | Flore |
| | (Continued) | |

FOREIGN PATENT DOCUMENTS

| | | |
|---|---|---|
| CN | 101536576 A | 9/2009 |
| CN | 101765172 A | 6/2010 |
| | (Continued) | |

OTHER PUBLICATIONS

International Search Report in international application No. PCT/CN2015/090283 dated Feb. 6, 2016.

(Continued)

*Primary Examiner* — Gbemileke J Onamuti
(74) *Attorney, Agent, or Firm* — Li & Cai Intellectual Property (USA) Office

(57) ABSTRACT

A method and a source evolved Node B (eNB) for performing cellular network relocation are provided. The method includes: sending, by a source eNB to a target eNB for relocation, a relocation Request (REQ) message configured to instruct the target eNB to execute a primary user-plane function, the relocation REQ message containing context information of User Equipment (UE) on the source eNB; and after receiving a relocation REQ Acknowledgement (ACK) message returned by the target eNB and configured to acknowledge that the target eNB is a primary eNB after relocation, sending, by the source eNB, context information of the primary user-plane function on the source eNB to the target eNB, and stopping executing the primary user-plane function, the relocation REQ ACK message containing a user-plane address for the target eNB to receive data packets after relocation.

19 Claims, 17 Drawing Sheets

(56) References Cited

U.S. PATENT DOCUMENTS

| | | |
|---|---|---|
| 2012/0281585 A1 | 11/2012 | Zhang |
| 2014/0113637 A1* | 4/2014 | Guan .................. H04W 8/082 455/437 |
| 2015/0071248 A1 | 3/2015 | Faerber |
| 2015/0146688 A1* | 5/2015 | Yasuda ............ H04W 36/0005 370/331 |
| 2016/0192245 A1 | 6/2016 | He et al. |
| 2016/0249259 A1 | 8/2016 | Park et al. |
| 2017/0318505 A1 | 11/2017 | Park et al. |

FOREIGN PATENT DOCUMENTS

| | | |
|---|---|---|
| EP | 1887809 A1 | 2/2008 |
| EP | 2528386 A1 | 11/2012 |
| WO | 2008058224 A2 | 5/2008 |
| WO | 2014177090 A1 | 11/2014 |
| WO | 2015047051 A1 | 4/2015 |

OTHER PUBLICATIONS

English Translation of the Written Opinion of the International Search Authority in international application No. PCT/CN2015/090283, dated Feb. 6, 2016.

Supplementary European Search Report in European application No. 15891203.0, dated Nov. 5, 2018.

3rd Generation Partnership project;Technical Specification Group Radio Access Network;Evolved Unjversal Terrestrial Radio Access(E-UTRA) and Evolved Universal Terrestrial Radio Access Network(E-UTRAN);Overall description;Stage 2(Release 12),3GPP Draft;36300-C50,(3GPP),Mobile Competence Centre;650,Route Des Lucioles; F-06921 Sophia-Antipolis Cedex;France Mar. 24, 2015 (Mar. 24, 2015), XP050952068,Retrieved from the Internet:URL:http://www.3gpp.org/ftpltsq_ran/WG2_RL2/Speci_fications/201503_final_specs_after_RAN_67.

Ericsson: Analysis of inter-MeNB handover without SeNB change,3GPP Draft; R3-150329,3rd Generation PARTNERSHIP Project (3GPP),Mobile Competence Centre;650,Route Des Lucioles ; F-06921 Sophia-ANTIP0LIS Cedex ; France vol.RAN WG3, No. Athens, Greece; Feb. 9, 2015-Feb. 13, 2015 Jan. 30, 2015 ,(Jan. 30, 2015), XP050953896,Retrieved from the Internet:URL:http://www.3gpp.org/ftp/tsg ran/WG3_lu/ TSGR3_87/Docs/.

* cited by examiner

CELLULAR NETWORK RELOCATION METHOD AND BASE STATION

TECHNICAL FIELD

The disclosure relates to the technical field of cellular network location, and in particular to a method and evolved Node B (eNB) for performing cellular network relocation.

BACKGROUND

In the development history of 3rd Generation Partnership Project (3GPP) systems, different systems adopt different handover technologies in different scenarios. In a macro-cell-dominated mobile network, for example, an Enhanced Data Rate for Global System for Mobile Communications Evolution (GSM EDGE) Radio Access Network (GERAN), a main purpose of handover is to protect continuity of coverage. In such a network, handover adopts a so-called "hard handover" manner. Hard handover refers to that User Equipment (UE) is disconnected from an original serving cell before being connected to a new target cell. Such a handover technology has a defect that there may exist a short interruption process for user-plane transmission in a handover process. For a real-time service, this also means packet loss. If a user-plane interruption time becomes relatively long because of an excessively small intercell overlapping region and the like, a user may obviously feel this interruption, and for example, may hear obvious "clicks".

When the 3GPP introduces a Universal Mobile Telecommunications System (UMTS), for improving a user experience, a "soft handover" technology is introduced. At first, mobile UE supporting soft handover is required to support a capability of keeping wireless connections with at least two cells. Before soft handover occurs, a network may connect the mobile UE with a target cell at first. Then, the network notifies the mobile UE of being handed over to this target cell. At the same time of handover to the target cell, the mobile UE may be required to be disconnected from a source target cell, and may also select to keep a wireless connection. Since wireless interface communication is kept all the time in this process, there is theoretically no user-plane interruption time. This is why such handover is called as "soft handover". If the source serving cell and the target cell are located within the same eNB, such handover is called as "softer handover". This is because message exchange and data packet forwarding processes between the source cell and the target cell are both eliminated. Therefore, the handover process is faster.

When the 3GPP develops a Long Term Evolution (LTE) system, for improving spectral efficiency, more and more microcells are adopted in engineering. There are two relatively significant differences between these microcells and macro-cells, one is that relatively high spectrum resources, for example, 2.4 GHz, are adopted, and the other is that their coverage is obviously narrowed, probably to be one tenth of the macro cells only. These microcells mainly function to absorb uplink and downlink service traffic of the mobile UE. Therefore, under a normal circumstance, these microcells have geographically overlapped coverage regions with the macro-cells, that is, the microcells are within coverage of the macro-cells under the normal circumstance. When moving among the macro-cells, the mobile UE may penetrate through a considerable number of microcells. If the handover technology is also adopted for penetrating through the microcells, a user-plane interruption may be generated. In addition, for the LTE system, signaling interaction with a core network is inevitable for both S1 handover and X2 handover. Excessive handover may cause a signaling storm of the core network. Under such a circumstance, the 3GPP introduces two technologies to eliminate negative influence brought by these microcells. When a backhaul between eNBs is an ideal backhaul, a Carrier Aggregation (CA) technology is adopted. When the backhaul between the eNBs is a non-ideal backhaul, a Dual Connectivity (DC) technology is adopted. If the CA technology is adopted, when the mobile UE penetrates through the microcells, handover is turned into a Secondary Cell (SCell) addition and deletion process. Since the UE always keeps being connected with a macro cell serving as a Primary Cell (PCell), SCell addition and deletion may not bring any user-plane interruption but cause traffic fluctuation of an air interface service. CA is configured on the premise that all Component Carriers (CCs) are controlled by a scheduler. Moreover, when the CCs are distributed at different stations, these stations are connected together through ideal backhauls. If the backhaul between the eNBs is non-ideal for some reasons, for example, a cost problem, the DC technology is required to be adopted. After DC is configured, the UE may be configured with three bearer manners, i.e. a Master Cell Group (MCG) bearer, a Secondary Cell Group (SCG) bearer and a split bearer. The MCG bearer refers to a radio bearer independently configured on an eNB. The SCG bearer refers to a bearer independently configured on a Secondary eNB (SeNB). The split bearer refers to a radio bearer configured on both the eNB and the SeNB. When the UE penetrates through coverage of the SeNB, an SeNB addition, deletion or SeNB changing process may be generated. For the split bearer, a bearer effect similar to that under CA may be achieved, that is, there is no user-plane interruption, but traffic fluctuation may be brought. However, for the SCG bearer, an effect similar to hard handover may be achieved.

CA and the split bearer under DC have achieved an effect similar to "seamless handover" from the angle of a user plane when the PCell is not changed. However, when the PCell is required to be changed or the SCG bearer requires replacement of the SeNB, the same problem of abovementioned "hard handover" or "soft handover" and "softer handover" may also appear on the user plane, i.e. the problem of user-plane interruption. The most important reason for the user-plane interruption is a security measure of the 3GPP.

For data security, ciphering and deciphering processes for user-plane data of the 3GPP systems on a wireless interface are required. In case of Radio Resource Control (RRC) signaling, an integrity protection process is also required. For the UMTS, security related configuration and calculation is implemented in a Radio Network Controller (RNC) above a Media Access Control (MAC) protocol layer. In the LTE system, security related configuration and calculation is implemented on a Packet Data Convergence Protocol (PDCP) layer. Once a security parameter is required to be reconfigured because of handover or SeNB changing, (a) PDCP and/or Radio Link Control (RLC) layer(s) of a related radio bearer are/is required to be reestablished, and a MAC layer and a Physical (PHY) layer may be reset. Moreover, a universal flow, usually a random access process, is required to be introduced to synchronize the security parameter, namely ensuring complete consistency in time when the mobile UE and the eNB adopt a new security parameter for a user plane of a certain specific radio bearer. Such a control-plane synchronization process and user-plane reestablishment/resetting process finally cause the user-plane interruption.

A trend of development of a cellular communication system in the future is that spectrums of low frequency bands become more and more valuable and expensive and microcells may use more spectrums of high frequency bands, for example, 3.5 GHz. With 6 GHz as a boundary, micrometer waves of more than 6 GHz will get increasingly popular. This narrows coverage of the microcells more because of spectrums. On the other hand, due to rapid development of technologies such as the mobile Internet and the Internet of things, a user connection number and user traffic in a unit area geometrically progressively increase. For increasing network traffic, it is feasible to arrange more microcells in a unit area. For reducing interference between the microcells, generated power of the microcells must be controlled within a certain range. This makes a future cellular network mainly characterized to be a high-density microcellular network. Under such a circumstance, a function of macro-cells may be degenerated mainly to bear control-plane signaling. In many indoor scenarios, for example, a gymnasium and a shopping mall, there may appear a network layout with only microcells. Compared with a prior macro-cellular homogeneous network or macro-cellular and microcellular homogeneous network, UE may move more frequently among the microcells.

Therefore, frequent replacement of a PCell may not be avoided even under the circumstance that CA or DC is configured. A user-plane interruption caused by frequent replacement of the PCell may seriously affect traffic control of a Transmission Control Protocol (TCP) layer, and in case of TCP congestion or TCP packet loss, TCP traffic control windows are rapidly reduced to make traffic control of the TCP layer zigzag.

SUMMARY

A technical problem to be solved by the disclosure is to provide a method and eNB for performing cellular network relocation, which may solve the problem of frequent user-plane interruption in a high-density microcellular network.

In order to solve the technical problem, the following technical solutions are adopted.

A method for performing cellular network relocation is provided, which may be applied to a source eNB for relocation and include that:

the source eNB sends, to a target eNB for relocation, a relocation Request (REQ) message configured to instruct the target eNB to execute a primary user-plane function, herein the relocation REQ message may contain context information of UE on the source eNB; and the source eNB, after receiving a relocation REQ Acknowledgement (ACK) message returned by the target eNB and configured to acknowledge that the target eNB is a primary eNB after relocation, sends context information of the primary user-plane function on the source eNB to the target eNB, and stops executing the primary user-plane function, herein the relocation REQACK message may contain a user-plane address for the target eNB to receive data packets after relocation.

Optionally, the source eNB may be a user-plane primary eNB, and the target eNB may be an SeNB;

a secondary user-plane function of the SeNB may keep being executed in a relocation process; and if the source eNB includes the secondary user-plane function, the secondary user-plane function of the source eNB may keep being executed in the relocation process.

Optionally, for an uplink radio bearer, the primary user-plane function may include: reordering data packets sent from the UE and processed by the secondary user-plane function; and for a downlink radio bearer, the primary user-plane function may include: numbering data packets from an upper-layer network; and the secondary user-plane function may include one or more of the following functions: a security function, an RLC protocol stack function, a MAC protocol stack function and a PHY protocol stack function.

Optionally, for the uplink radio bearer, the context information, sent to the target eNB by the source eNB, of the primary user-plane function may include: context information of reordering of the data packets by the primary user-plane function; and for the downlink radio bearer, the context information, sent to the target eNB by the source eNB, of the primary user-plane function may include: context information of numbering of the data packets by the primary user-plane function.

Optionally, the context information of the UE on the source eNB may include at least one of:

configuration information of the primary user-plane function, capability information of the UE, control-plane and user-plane address information of the upper-layer network, bearer configuration information sent to the source eNB by the upper-layer network and a user-plane address for the SeNB to receive data packets after relocation.

Optionally, for the uplink radio bearer, after the step that the relocation REQACK message sent by the target eNB is received, the method may further include that: a relocation notification message is sent to another SeNB other than the target eNB, the relocation notification message being configured to notify the primary eNB to be relocated from the source eNB to the target eNB and the relocation notification message containing the user-plane address for the target eNB to receive the data packets.

Optionally, for the uplink radio bearer, after the step that the context information of the primary user-plane function on the source eNB is sent to the target eNB, the method may further include that:

data packets processed by the secondary user-plane function of the source eNB and/or received data packets processed by the other SeNB are sent to the target eNB; and for the downlink radio bearer, after the step that the context information of the primary user-plane function on the source eNB is sent to the target eNB, the method may further include that:

data packets sent from the upper-layer network and not yet numbered by the primary user-plane function are sent to the target eNB, and/or data packets sent from the upper-layer network, numbered by the primary user-plane function but not yet sent to another SeNB other than the SeNB are locally cached, the cached data packets are processed using the secondary user-plane function on the source eNB, and the processed data packets are sent to the UE.

Optionally, if the target eNB is a newly added eNB, the context information of the UE contained in the relocation REQ message sent to the target eNB by the source eNB may further include: configuration information of the secondary user-plane function of the UE on the source eNB.

Optionally, if the target eNB is a newly added eNB, after the step that the source eNB receives the relocation REQACK message sent by the target eNB, the method may further include that:

if a control-plane primary eNB before relocation is started is the source eNB, the source eNB initiates an RRC reconfiguration process between the source eNB and the UE, and if the control-plane primary eNB before relocation is started is another eNB, the source eNB notifies said another eNB to initiate an RRC reconfiguration process between said another eNB and the UE, herein, in the RRC reconfiguration process, the UE may be notified that the user-plane primary eNB is relocated from the source eNB to the target eNB, and configuration information of the secondary user-plane function of the target eNB may be sent to the UE.

A method for performing cellular network relocation is provided, which may be applied to a target eNB for relocation and include that:

the target eNB, after receiving a relocation REQ message configured to instruct the target eNB to execute a primary user-plane function from a source eNB, returns, to the source eNB, a relocation REQACK message configured to acknowledge that the target eNB is a primary eNB after relocation, herein the relocation REQACK message may contain a user-plane address for the target eNB to receive data packets after relocation, and the relocation REQ message may contain context information of UE on the source eNB; and the target eNB, after receiving context information of the primary user-plane function from the source eNB, executes the primary user-plane function.

Optionally, the source eNB may be a user-plane primary eNB, and the target eNB may be an SeNB;

a secondary user-plane function of the SeNB may keep being executed in a relocation process; and if the source eNB includes the secondary user-plane function, the secondary user-plane function of the source eNB may keep being executed in the relocation process.

Optionally, for an uplink radio bearer, the primary user-plane function may include: reordering data packets sent from the UE and processed by the secondary user-plane function; and for a downlink radio bearer, the primary user-plane function may include: numbering data packets from an upper-layer network; and the secondary user-plane function may include one or more of the following functions: a security function, an RLC protocol stack function, a MAC protocol stack function and a PHY protocol stack function.

Optionally, for the uplink radio bearer, the context information, sent to the target eNB by the source eNB, of the primary user-plane function may include: context information of reordering of the data packets by the primary user-plane function; and for the downlink radio bearer, the context information, sent to the target eNB by the source eNB, of the primary user-plane function may include: context information of numbering of the data packets by the primary user-plane function.

Optionally, the context information of the UE on the source eNB may include at least one of: configuration information of the primary user-plane function, capability information of the UE, control-plane and user-plane address information of the upper-layer network, bearer configuration information sent to the source eNB by the upper-layer network and a user-plane address for the SeNB to receive data packets after relocation.

Optionally, for the uplink radio bearer, after the step that the target eNB returns the relocation REQACK message to the source eNB, the method may further include that: data packets processed by the target eNB are locally cached; and/or data packets processed by the secondary user-plane function of another eNB are received.

Optionally, the step that the target eNB, after receiving the context information of the primary user-plane function from the source eNB, executes the primary user-plane function may include that:

for the uplink radio bearer, after the context information of the primary user-plane function is received from the source eNB, the data packets are reordered according to the context information of reordering, and the data packets are sent to the upper-layer network in order; and/or, for the downlink radio bearer, after the context information of the primary user-plane function is received from the source eNB, the data packets are numbered, and the numbered data packets are sent to the user-plane address of the eNB including the secondary user-plane function.

Optionally, the method may further include that:

if a control-plane primary eNB after relocation is the target eNB, after the step that the target eNB returns, to the source eNB, the relocation REQACK message configured to acknowledge that the eNB is the primary eNB after relocation, the target eNB further initiates a route handoff process configured to notify the upper-layer network to handoff a route to the target eNB; and if the control-plane primary eNB after relocation is another eNB, after the step that the target eNB returns, to the source eNB, the relocation REQACK message configured to acknowledge that the eNB is the primary eNB after relocation, the target eNB further notifies said another eNB to initiate the route handoff process configured to notify the upper-layer network to handoff the route to the target eNB.

An eNB for performing cellular network relocation is provided, which may include a Request (REQ) module and a response receiving and processing module, herein the REQ module may be configured to: send, to a target eNB for relocation, a relocation REQ message configured to instruct the target eNB to execute a primary user-plane function, herein the relocation REQ message may contain context information of UE on the source eNB; and the response receiving and processing module may be configured to: after receiving a relocation REQACK message returned by the target eNB and configured to acknowledge that the target eNB is a primary eNB after relocation, send context information of the primary user-plane function on the eNB to the target eNB, and stop executing the primary user-plane function, herein the relocation REQACK message may contain a user-plane address for the target eNB to receive data packets after relocation.

Optionally, the source eNB may be a user-plane primary eNB, and the target eNB may be an SeNB;

a secondary user-plane function of the SeNB may keep being executed in a relocation process; and if the source eNB includes the secondary user-plane function, the secondary user-plane function of the source eNB may keep being executed in the relocation process.

Optionally, for an uplink radio bearer, the primary user-plane function may include: reordering data packets sent from the UE and processed by the secondary user-plane function; and for a downlink radio bearer, the primary user-plane function may include: numbering data packets from an upper-layer network; and the secondary user-plane function may include one or more of the following functions: a security function, an RLC protocol stack function, a MAC protocol stack function and a PHY protocol stack function.

Optionally, for the uplink radio bearer, the context information, sent to the target eNB by the source eNB, of the primary user-plane function may include: context information of reordering of the data packets by the primary user-plane function; and for the downlink radio bearer, the context information, sent to the target eNB by the source eNB, of the primary user-plane function may include: context information of numbering of the data packets by the primary user-plane function.

Optionally, the context information of the UE on the source eNB may include at least one of:

configuration information of the primary user-plane function, capability information of the UE, control-plane and user-plane address information of the upper-layer network, bearer configuration information sent to the source eNB by the upper-layer network and a user-plane address for the SeNB to receive data packets after relocation.

Optionally, the response receiving and processing module may further be configured to: for the uplink radio bearer, after receiving the relocation REQACK message sent by the target eNB, send a relocation notification message to another SeNB, the relocation notification message being configured to notify the primary eNB to be relocated from the source eNB to the target eNB and the relocation notification message containing the user-plane address for the target eNB to receive the data packets.

Optionally, the response receiving and processing module may further be configured to: for the uplink radio bearer, after sending the context information of the primary user-plane function on the source eNB to the target eNB, send data packets processed by the secondary user-plane function of the eNB and/or received data packets processed by the other SeNB the target eNB; and/or, for the downlink radio bearer, after sending the context information of the primary user-plane function on the source eNB to the target eNB, send, to the target eNB, data packets sent from the upper-layer network and not yet numbered by the primary user-plane function, and/or locally cache data packets sent from the upper-layer network, numbered by the primary user-plane function but not yet sent to another SeNB other than the SeNB, process the cached data packets using the secondary user-plane function on the source eNB and send the processed data packets to the UE.

Optionally, if the target eNB is a newly added eNB, the context information of the UE contained in the relocation REQ message sent to the target eNB by the source eNB may further include: configuration information of the secondary user-plane function of the UE on the source eNB.

Optionally, the response receiving and processing module may further be configured to:

if the target eNB is a newly added eNB, after receiving the relocation REQACK message sent by the target eNB, if a control-plane primary eNB before relocation is started is the eNB, initiate an RRC reconfiguration process between the eNB and the UE, and if the control-plane primary eNB before relocation is started is another eNB, notify said another eNB to initiate an RRC reconfiguration process between said another eNB and the UE, herein, in the RRC reconfiguration process, the UE may be notified that the user-plane primary eNB is relocated from the source eNB to the target eNB, and configuration information of the secondary user-plane function of the target eNB may be sent to the UE.

An eNB for performing cellular network relocation is provided, which may include a REQ receiving and processing module and a relocation execution module, herein the REQ receiving and processing module may be configured to: after receiving a relocation REQ message configured to instruct the target eNB to execute a primary user-plane function from a source eNB, return, to the source eNB, a relocation REQACK message configured to acknowledge that the target eNB is a primary eNB after relocation, herein the relocation REQACK message may contain a user-plane address for the eNB to receive data packets after relocation, and the relocation REQ message may contain context information of UE on the source eNB; and the relocation execution module may be configured to: after receiving context information of the primary user-plane function from the source eNB, execute the primary user-plane function.

Optionally, the source eNB may be a user-plane primary eNB, and the target eNB may be an SeNB;

a secondary user-plane function of the SeNB may keep being executed in a relocation process; and if the source eNB includes the secondary user-plane function, the secondary user-plane function of the source eNB may keep being executed in the relocation process.

Optionally, for an uplink radio bearer, the primary user-plane function may include: reordering data packets sent from the UE and processed by the secondary user-plane function; and for a downlink radio bearer, the primary user-plane function may include: numbering data packets from an upper-layer network; and the secondary user-plane function may include one or more of the following functions: a security function, an RLC protocol stack function, a MAC protocol stack function and a PHY protocol stack function.

Optionally, for the uplink radio bearer, the context information, sent to the target eNB by the source eNB, of the primary user-plane function may include: context information of reordering of the data packets by the primary user-plane function; and for the downlink radio bearer, the context information, sent to the target eNB by the source eNB, of the primary user-plane function may include: context information of numbering of the data packets by the primary user-plane function.

Optionally, the context information of the UE on the source eNB may include at least one of:

configuration information of the primary user-plane function, capability information of the UE, control-plane and user-plane address information of the upper-layer network, bearer configuration information sent to the source eNB by the upper-layer network and a user-plane address for the SeNB to receive data packets after relocation.

Optionally, the REQ receiving and processing module may further be configured to: for the uplink radio bearer, after returning the relocation REQACK message to the source eNB, locally cache data packets processed by the eNB, and/or receive data packets processed by the secondary user-plane function of another eNB.

Optionally, the relocation execution module may be configured to, after receiving the context information of the primary user-plane function from the source eNB, execute the primary user-plane function in the following manner:

for the uplink radio bearer, after receiving the context information of the primary user-plane function from the source eNB, reordering the data packets according to the context information of reordering, and sending the data packets to the upper-layer network in order; and/or, for the downlink radio bearer, after receiving the context information of the primary user-plane function from the source eNB, numbering the data packets, and sending the numbered data packets to the user-plane address of the eNB including the secondary user-plane function.

Optionally, the eNB may further include a route handoff processing module, herein the route handoff processing module may be configured to: if a control-plane primary eNB after relocation is the eNB, after returning, to the source eNB, the relocation REQACK message configured to acknowledge that the eNB is the primary eNB after relocation, initiate a route handoff process configured to notify the upper-layer network to handoff a route to the target eNB; and if the control-plane primary eNB after relocation is another eNB, after returning, to the source eNB, the relocation REQACK message configured to acknowledge that the eNB is the primary eNB after relocation, notify said another eNB to initiate the route handoff process configured to notify the upper-layer network to handoff the route to the target eNB.

Compared with a related technology, the method and eNB provided by the technical solutions of the disclosure for performing cellular network relocation have the advantages that the source eNB for relocation notifies the target eNB for relocation to execute the primary user-plane function, the source eNB stops executing the primary user-plane function on the eNB after receiving the ACK message fed back by the target eNB, and sends the context information of the primary user-plane function to the target eNB, and the target eNB executes the primary user-plane function after receiving the context information of the primary user-plane function, herein the primary user-plane function includes: a function of numbering the data packets received from the upper-layer network in a downlink direction and reordering the data packets from the UE in an uplink direction; and the secondary user-plane function includes: performing deciphering processing on the received data packets in the uplink direction and performing ciphering processing on the data packets in the downlink direction. In the technical solutions of the disclosure, the secondary user-plane function on a wireless interface of each eNB keeps being continuously executed, that is, no protocol stack resetting operation is performed, and a key configuration parameter (for example, a ciphering/deciphering parameter related to security) is not changed. Therefore, in the technical solutions of the disclosure, user-plane interruptions may be avoided when the UE moves in a high-density microcellular network, and a primary eNB relocation function in the technical solutions of the disclosure is a nondestructive and seamless process.

DETAILED DESCRIPTION

Figure 1:
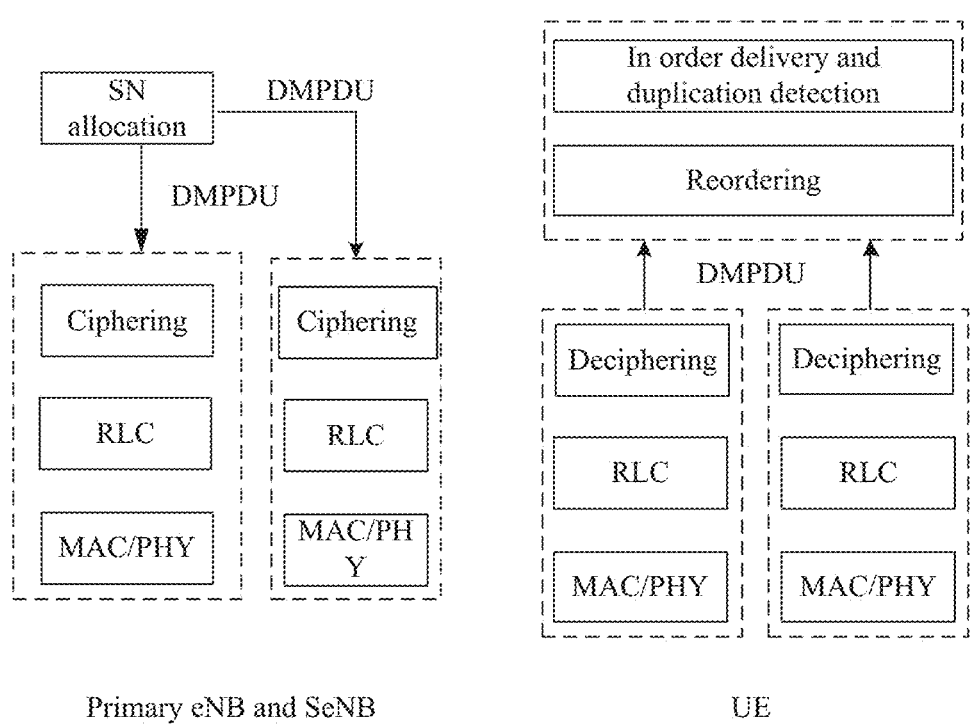
FIG. 1 is a protocol stack of a downlink according to an embodiment of the disclosure.

The below is a summary about a theme described in detail in the disclosure. The summary is not intended to limit the scope of protection of the claims.

Embodiments of the disclosure will be described below in detail in combination with the drawings. It is important to note that the embodiments in the disclosure and characteristics in the embodiments may be freely combined without conflicts.

In the embodiments of the disclosure, a user-plane function of a radio bearer consists of two parts, i.e. a primary user-plane function and a secondary user-plane function. UE configured with the radio bearer is in wireless connection to two or more than two eNBs, herein the eNB at least including the primary user-plane function is called as a user-plane primary eNB, and a radio bearer has only one user-plane primary eNB; and the other eNB(s) only including the secondary user-plane function are called as SeNBs.

The user-plane primary eNB is configured to receive upper-layer data, usually an Internet Protocol (IP) data packet, or send the received data packet to an upper-layer network. That is, the user-plane primary eNB is an anchor of a radio bearer established on the UE. A module realizing the primary user-plane function on the user-plane primary eNB is called as a primary user-plane module. Modules realizing the secondary user-plane function on the SeNBs and the user-plane primary eNB are called as secondary user-plane modules.

A control-plane primary eNB performs control-plane signaling interaction with the upper-layer network and the UE, and is configured to control a radio bearer establishment process and a primary eNB relocation process in the embodiments of the disclosure. All radio bearers share the same control-plane primary eNB.

User-plane primary eNBs of different radio bearers may be on different eNBs, and may also be on the same eNB.

The control-plane primary eNB and the user-plane primary eNB may be on different eNBs, and may also be on the same eNB.

Primary eNB relocation in the embodiments of the disclosure refers to relocation of the user-plane primary eNB. When the control-plane primary eNB and the user-plane primary eNB are on the same eNB and the network determines to simultaneously relocate the control-plane primary eNB and the user-plane primary eNB, primary eNB relocation further includes relocation of the control-plane primary eNB.

The primary eNB mentioned hereinafter refers to the user-plane primary eNB, unless otherwise noted.

In a downlink direction, the upper-layer network sends an IP packet to a primary eNB, a primary user-plane module of the primary eNB processes (for example, numbering) the IP packet to obtain a Protocol Data Unit (PDU) (called as a DMPDU herein) for transmission to secondary user-plane modules of the eNB and an SeNB, the secondary user-plane module of the primary eNB processes (for example, ciphering) the DMPDU to obtain a PDU (CPDU) so as to be sent to UE, and the secondary user-plane module of the SeNB processes (for example, ciphering) the DMPDU to obtain a PDU (CPDU) so as to be sent to the UE. The UE processes (for example, deciphering) the CPDUs from the primary eNB and the SeNB to obtain the DMPDU, and then reorders the DMPDU for transmission to the upper layer.

In an uplink direction, the UE numbers an IP packet to obtain a PDU (called as a UPDU herein), then further processes (for example, ciphering) the UPDU to obtain a CPDU, and sends the CPDU to the primary eNB and the SeNB. The secondary user-plane module of the primary eNB processes (for example, deciphering) the CPDU to obtain the UPDU, the secondary user-plane module of the SeNB processes (for example, deciphering) the CPDU to obtain a UPDU so as to be sent to the primary eNB, and the primary user-plane module of the primary eNB reorders the UPDUs from the eNB and the SeNB so as to be sent to the upper-layer network.

For a downlink of a radio bearer, a primary user-plane function at least includes a function of numbering upper-layer data. The primary user-plane function may include a header compression function.

For an uplink of a radio bearer, a primary user-plane function at least includes functions of reordering and transmitting data packets to the upper layer in order.

A secondary user-plane function at least includes a security function, including, but not limited to, a ciphering function (as a sending party) and a deciphering function (as a receiving party). The secondary user-plane function may further include an RLC protocol stack function, a MAC protocol stack function and a PHY protocol stack function.

For example, there are two eNBs, and a protocol stack of a downlink is shown in FIG. 1. In FIG. 1, a primary user-plane function is Sequence Number (SN) allocation, i.e. an SN allocation function, and a secondary user-plane function refers to ciphering and RLC/MAC/PHY protocol stack functions.

In FIG. 1, executive RLC/MAC/PHY functions of a primary eNB and an SeNB are consistent. Their configuration parameters may be the same, and may also be different, herein the configuration parameters, for example, keys, in ciphering of the primary eNB and the SeNB, are different, and a Data Radio Bearer (DRB) processing function is the same.

On a UE side, besides deciphering/RLC/MAC/PHY functions, a receiving party further includes a reordering function and an in order delivery and duplication detection function, herein the reordering function refers to that UE, after receiving PDUs of different eNBs, is required to reorder these PDUs in a reordering window, and this is because a sequential order of PDUs received from different eNBs cannot be ensured although the PDUs received from any eNB are sequentially received. Configuration parameters in deciphering keep being consistent with the configuration parameters in ciphering of the corresponding eNBs respectively, and then successful decoding may be ensured.

Figure 2:
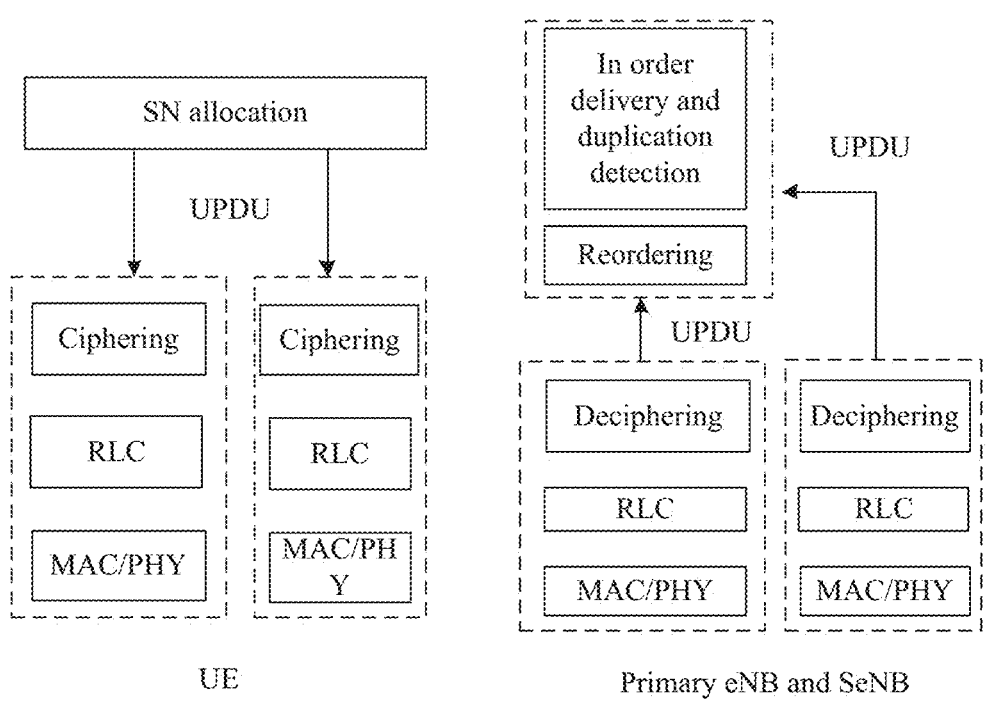
FIG. 2 is a protocol stack of an uplink according to an embodiment of the disclosure.

For example, there are two eNBs, and a protocol stack of an uplink is shown in FIG. 2, herein, there is only one primary eNB, and there may be multiple SeNBs.

In FIG. 2, a primary user-plane function refers to a reordering function and an in order delivery and duplication detection function. A secondary user-plane function refers to a deciphering function and an RLC/MAC/PHY protocol stack function. A Hyper Frame Number (HFN) synchronization process may be implemented between a primary user plane and a secondary user plane to ensure smooth completion of deciphering of the secondary user plane. For the deciphering function, if current HFN deciphering fails, HFN+1 may be tried to be adopted for a deciphering operation.

Figure 3:
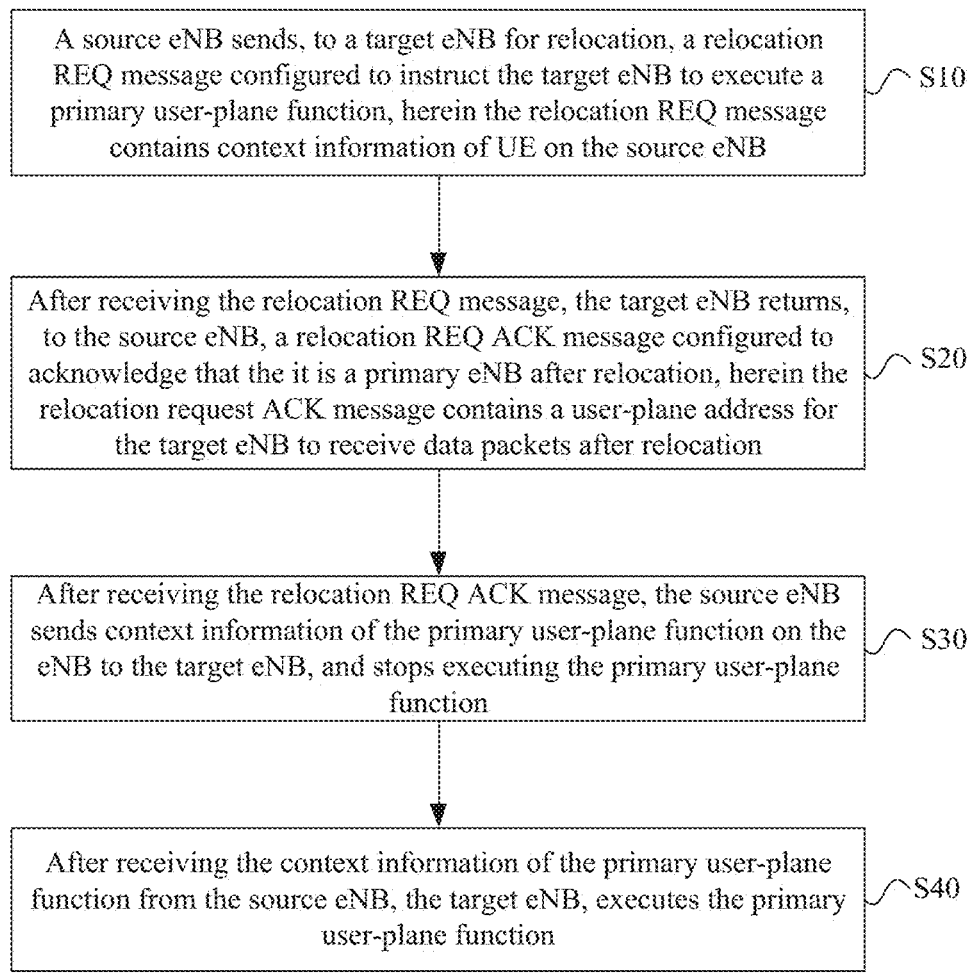
FIG. 3 is a flowchart of a method (including a source eNB and a target eNB) for performing cellular network relocation according to an embodiment of the disclosure.

As shown in FIG. 3, an embodiment of the disclosure provides a method for performing cellular network relocation, and the method includes the following steps.

In S10, a source eNB sends, to a target eNB for relocation, a relocation REQ message configured to instruct the target eNB to execute a primary user-plane function, herein the relocation REQ message contains context information of UE on the source eNB.

In S20, after receiving the relocation REQ message, the target eNB returns, to the source eNB, a relocation REQACK message configured to acknowledge that it a primary eNB after relocation, the relocation REQACK message containing a user-plane address for the target eNB to receive data packets after relocation.

In S30, after receiving the relocation REQACK message, the source eNB sends context information of the primary user-plane function on the eNB to the target eNB, and stops executing the primary user-plane function.

In S40, after receiving the context information of the primary user-plane function from the source eNB, the target eNB executes the primary user-plane function.

The method may further include the following characteristics.

Herein, the source eNB is a user-plane primary eNB, and the target eNB is an SeNB;

a secondary user-plane function of the SeNB keeps being executed in a relocation process; and if the source eNB includes the secondary user-plane function, the secondary user-plane function of the source eNB keeps being executed in the relocation process. That is, the secondary user-plane functions of the source eNB, the target eNB and/or another SeNB keep being executed in the relocation process, and configuration parameters related to security on the secondary user-plane functions keep being unchanged. That is, the secondary user-plane functions have no resetting operation over any protocol stack function.

Herein, for an uplink radio bearer, the primary user-plane function includes: reordering data packets sent from the UE and processed by the secondary user-plane function; and for a downlink radio bearer, the primary user-plane function includes: numbering data packets from an upper-layer network; and the secondary user-plane function further includes one or more of the following functions: a security function, an RLC protocol stack function, a MAC protocol stack function and a PHY protocol stack function.

Herein, the target eNB is an SeNB which has worked before relocation is initiated or a newly added eNB.

Herein, the context information of the UE on the source eNB includes at least one of: configuration information of the primary user-plane function, UE capability information of the UE, control-plane and user-plane address information of the upper-layer network, bearer configuration information sent to the source eNB by the upper-layer network and a user-plane address for the SeNB to receive data packets after relocation.

Herein, the SeNB after relocation includes: the source eNB and/or the other SeNB.

Herein, after the target eNB receives the relocation REQ message, the method further includes that: the target eNB stores the context information of the UE received from the relocation REQ message.

Herein, for the uplink radio bearer, after the target eNB sends the relocation REQACK message to the source eNB, the method further includes that: the target eNB locally caches the processed data packets.

Herein, for the uplink radio bearer, after the source eNB receives the relocation REQACK message from the target eNB, the method further includes that: the source eNB sends a relocation notification message to the other SeNB, the relocation notification message being configured to notify relocation of the primary eNB from the source eNB to the target eNB and containing the user-plane address for the target eNB to receive the data packets.

Herein, for the uplink radio bearer, the method further includes that: the other SeNB, after receiving the relocation notification message from the source eNB, sends the processed data packets to the target eNB.

Herein, for the uplink radio bearer, the context information, sent to the target eNB by the source eNB, of the primary user-plane function includes: context information of reordering of the data packets by the primary user-plane function.

Herein, for the uplink radio bearer, after the source eNB sends the context information of the primary user-plane to the target eNB, the method further includes that:

the source eNB sends the data packets processed by the secondary user-plane function of the eNB and/or the received data packets processed by the other SeNB to the target eNB.

Herein, for the uplink radio bearer, the step that the target eNB, after receiving the context information of the primary user-plane function from the source eNB, executes the primary user-plane function includes that:

the target eNB reorders the data packets according to the context information of reordering, and sends the data packets to the upper-layer network in order.

For the downlink radio bearer, the context information, sent to the target eNB by the source eNB, of the primary user-plane function includes:

context information of numbering of the data packets by the primary user-plane function.

Herein, the context information of numbering of the data packets by the primary user-plane function includes: a first SN which may be allocated to a data packet by the target eNB after relocation or a last SN which is allocated to a data packet by the primary user-plane function of the eNB.

Herein, for the downlink radio bearer, the step that the target eNB, after receiving the context information of the primary user-plane function from the source eNB, executes the primary user-plane function includes that:

the data packets are numbered, and the numbered data packets are sent to the user-plane address(es) of the source eNB and/or the other SeNB.

Herein, for the downlink radio bearer, after the source eNB sends the context information of the primary user-plane function to the target eNB, the method further includes that:

data packets sent from the upper-layer network and not yet numbered by the primary user-plane function are sent to the target eNB; and/or data packets sent from the upper-layer network, numbered by the primary user-plane function but not yet sent to the other SeNB are locally cached, the cached data packets are processed using the secondary user-plane function on the eNB and the processed data packets are sent to the UE.

Herein, if the target eNB is a newly added eNB, the context information of the UE contained in the relocation REQ message sent to the target eNB by the source eNB further includes: configuration information of the secondary user-plane function of the UE on the source eNB.

Herein, the configuration information of the secondary user-plane function of the UE on the source eNB includes: a key parameter.

Herein, if the target eNB is a newly added eNB, the relocation REQACK message sent to the source eNB by the target eNB further contains: configuration information of the secondary user-plane function of the target eNB.

Herein, if the target eNB is a newly added eNB, after the source eNB receives the relocation REQACK message sent by the target eNB, the method further includes that:

if a control-plane primary eNB before relocation is started is the source eNB, the source eNB initiates an RRC reconfiguration process between the source eNB and the UE, and if the control-plane primary eNB before relocation is started is another eNB, the source eNB notifies said another eNB to initiate an RRC reconfiguration process between said another eNB and the UE, herein, in the RRC reconfiguration process, the UE is notified that the user-plane primary eNB is relocated from the source eNB to the target eNB, and configuration information of the secondary user-plane function of the target eNB is sent to the UE.

Herein, if the source eNB is not an SeNB after relocation any more, in the RRC reconfiguration process between the source eNB and the UE, the method further includes that: the source eNB notifies the UE that it is not an SeNB any more, and the UE, after receiving the notification, stops data communication with the source eNB.

Herein, if the source eNB is not an SeNB any more, after the target eNB completes the route handoff process with the upper-layer network, the method further includes that: the target eNB notifies the source eNB to delete the context information of the UE.

Herein, after the source eNB receives the relocation REQACK message from the target eNB, the method further includes that: the source eNB sends an RRC message configured to notify the UE that the primary eNB is relocated from the source eNB to the target eNB to the UE.

Herein, different radio bearers correspond to the same or different user-plane primary eNBs, and a primary eNB corresponding to a user plane of the same bearer is the same as or different from a primary eNB corresponding to a control plane.

Figure 4:
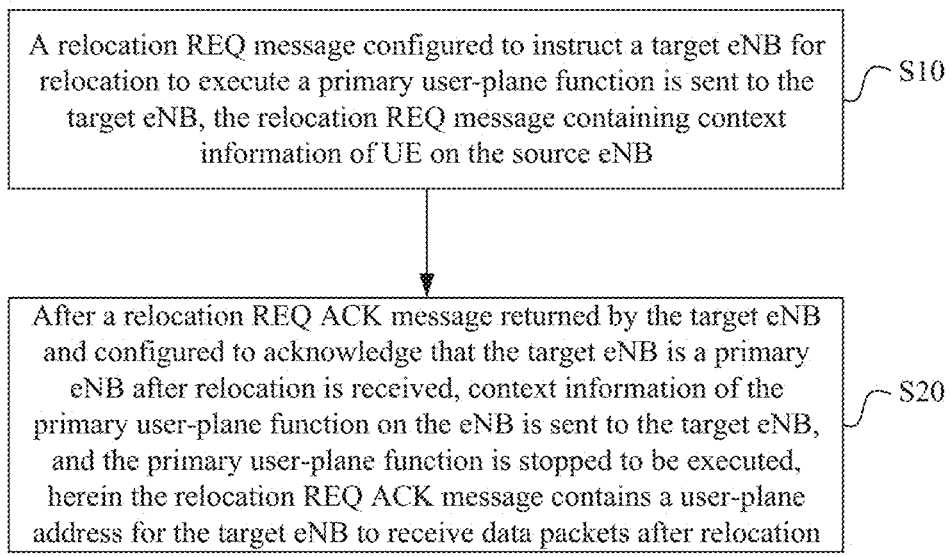
FIG. 4 is a flowchart of a method (a source eNB) for performing cellular network relocation according to an embodiment of the disclosure.

As shown in FIG. 4, an embodiment of the disclosure provides a method for performing cellular network relocation, which is applied to a source eNB for relocation and includes the following steps.

In S10, a relocation REQ message configured to instruct a target eNB for relocation to execute a primary user-plane function is sent to the target eNB, the relocation REQ message containing context information of UE on the source eNB.

In S20, after a relocation REQACK message returned by the target eNB and configured to acknowledge that the target eNB is a primary eNB after relocation is received, context information of the primary user-plane function on the eNB is sent to the target eNB, and the primary user-plane function is stopped to be executed, herein the relocation REQACK message contains a user-plane address for the target eNB to receive data packets after relocation.

The method may further include the following characteristics.

Herein, the source eNB is a user-plane primary eNB, and the target eNB is an SeNB;

a secondary user-plane function of the SeNB keeps being executed in a relocation process; and if the source eNB includes the secondary user-plane function, the secondary user-plane function of the source eNB keeps being executed in the relocation process.

Herein, for an uplink radio bearer, the primary user-plane function includes: reordering data packets sent from the UE and processed by the secondary user-plane function; and for a downlink radio bearer, the primary user-plane function includes: numbering data packets from an upper-layer network; and the secondary user-plane function further includes one or more of the following functions: a security function, an RLC protocol stack function, a MAC protocol stack function and a PHY protocol stack function.

Herein, the security function, for example, for the downlink bearer, performs ciphering processing on the data packets from the upper-layer network, and for the uplink radio bearer, performs deciphering processing on the data packets from the UE.

Herein, the context information of the UE on the source eNB includes at least one of: configuration information of the primary user-plane function, capability information of the UE, control-plane and user-plane address information of the upper-layer network, bearer configuration information sent to the source eNB by the upper-layer network and a user-plane address for the SeNB to receive data packets after relocation.

Herein, for the uplink radio bearer, after the relocation REQACK message sent by the target eNB is received, the method further includes that: a relocation notification message is sent to another SeNB other than the target eNB, the relocation notification message being configured to notify the primary eNB to be relocated from the source eNB to the target eNB and containing the user-plane address for the target eNB to receive the data packets.

Herein, for the uplink radio bearer, the context information, sent to the target eNB by the source eNB, of the primary user-plane function includes: context information of reordering of the data packets by the primary user-plane function.

Herein, for the downlink radio bearer, the context information, sent to the target eNB by the source eNB, of the primary user-plane function includes: context information of numbering of the data packets by the primary user-plane function.

Herein, the context information of numbering of the data packets by the primary user-plane function includes: a first SN which may be allocated to a data packet by the target eNB after relocation or a last SN which is allocated to a data packet by the primary user-plane function of the eNB.

Herein, for the uplink radio bearer, after the context information of the primary user-plane function is sent to the target eNB, the method further includes that: data packets processed by the secondary user-plane function of the eNB and/or received data packets processed by the other SeNB are sent to the target eNB.

Herein, for the downlink radio bearer, after the context information of the primary user-plane function is sent to the target eNB, the method further includes that:

data packets sent from the upper-layer network and not yet numbered by the primary user-plane function are sent to the target eNB, and/or data packets sent from the upper-layer network, numbered by the primary user-plane function but not yet sent to another SeNB other than the SeNB are locally cached, the cached data packets are processed using the secondary user-plane function on the source eNB and the processed data packets are sent to the UE.

Herein, if the target eNB is a newly added eNB, the context information of the UE contained in the relocation REQ message sent to the target eNB by the source eNB further includes: configuration information of the secondary user-plane function of the UE on the source eNB.

Herein, if the target eNB is a newly added eNB, after the relocation REQACK message sent by the target eNB is received, the method further includes that:

if a control-plane primary eNB before relocation is started is the source eNB, the source eNB initiates an RRC reconfiguration process between the source eNB and the UE, and if the control-plane primary eNB before relocation is started is another eNB, the source eNB notifies said another eNB to initiate an RRC reconfiguration process between said another eNB and the UE, herein, in the RRC reconfiguration process, the UE is notified that the user-plane primary eNB is relocated from the source eNB to the target eNB, and configuration information of the secondary user-plane function of the target eNB is sent to the UE.

Herein, if the source eNB is not an SeNB after relocation any more, in the RRC reconfiguration process with the UE, the method further includes that: the UE is notified that the eNB is not an SeNB any more.

Herein, after the relocation REQACK message sent by the target eNB is received, the method further includes that: an RRC message configured to notify the UE that the primary eNB is relocated from the source eNB to the target eNB is sent to the UE.

Herein, different radio bearers correspond to the same or different user-plane primary eNBs, and a primary eNB corresponding to a user plane of the same bearer is the same as or different from a primary eNB corresponding to a control plane.

Figure 5:
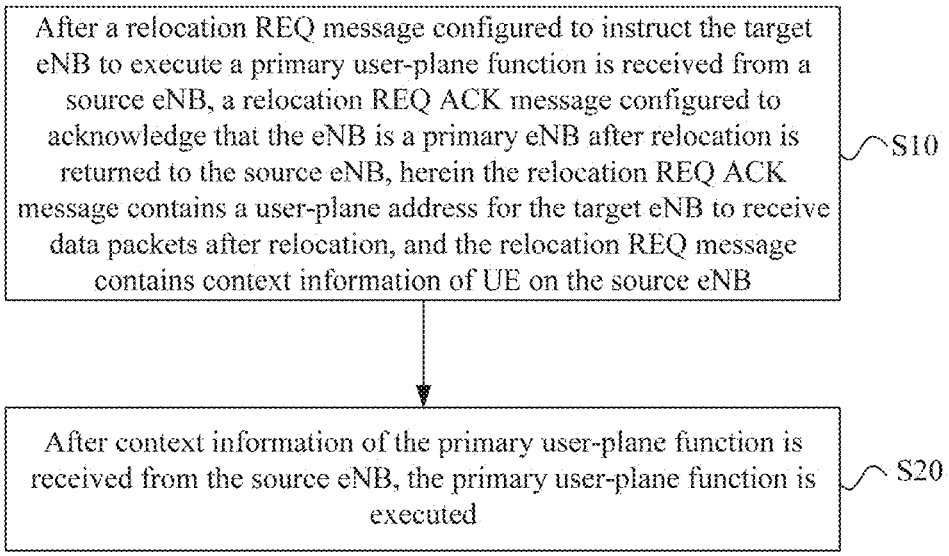
FIG. 5 is a flowchart of a method (a target eNB) for performing cellular network relocation according to an embodiment of the disclosure.

As shown in FIG. 5, an embodiment of the disclosure provides a method for performing cellular network relocation, which is applied to a target eNB for relocation and includes the following steps.

In S10, after a relocation REQ message configured to instruct the target eNB to execute a primary user-plane function is received from a source eNB, a relocation REQACK message configured to acknowledge that the eNB is a primary eNB after relocation is returned to the source eNB, herein the relocation REQACK message contains a user-plane address for the target eNB to receive data packets after relocation, and the relocation REQ message contains context information of UE on the source eNB.

In S20, after context information of the primary user-plane function is received from the source eNB, the primary user-plane function is executed.

The method may further include the following characteristics.

Herein, the source eNB is a user-plane primary eNB, and the target eNB is an SeNB:

a secondary user-plane function of the SeNB keeps being executed in a relocation process; and if the source eNB includes the secondary user-plane function, the secondary user-plane function of the source eNB keeps being executed in the relocation process.

Herein, the target eNB is an SeNB which has worked before relocation is initiated or a newly added eNB.

Herein, for an uplink radio bearer, the primary user-plane function includes: reordering data packets sent from the UE and processed by the secondary user-plane function; and for a downlink radio bearer, the primary user-plane function includes: numbering data packets from an upper-layer network; and the secondary user-plane function further includes one or more of the following functions: a security function, an RLC protocol stack function, a MAC protocol stack function and a PHY protocol stack function.

Herein, the context information of the UE on the source eNB includes at least one of: configuration information of the primary user-plane function, capability information of the UE, control-plane and user-plane address information of the upper-layer network, bearer configuration information sent to the source eNB by the upper-layer network and a user-plane address for the SeNB to receive data packets after relocation.

Herein, an SeNB after relocation includes: the source eNB and/or another SeNB.

Herein, after the relocation REQ message is received, the method further includes that: the context information of the UE received from the relocation REQ message is stored.

Herein, for the uplink radio bearer, after the relocation REQACK message is sent to the source eNB, the method further includes that: data packets processed by the eNB are locally cached.

Herein, for the uplink radio bearer, after the relocation REQACK message is sent to the source eNB, the method further includes that: data packets processed by the secondary user-plane function of the other SeNB are received.

Herein, for the uplink radio bearer, the context information, sent to the target eNB by the source eNB, of the primary user-plane function includes: context information of reordering of the data packets by the primary user-plane function.

Herein, for the downlink radio bearer, the context information, sent to the target eNB by the source eNB, of the primary user-plane function includes: context information of numbering of the data packets by the primary user-plane function.

Herein, the context information of numbering of the data packets by the primary user-plane function includes: a first SN which may be allocated to a data packet by the target eNB after relocation or a last SN which is allocated to a data packet by the primary user-plane function of the eNB.

Herein, the operation that the primary user-plane function is executed after the context information of the primary user-plane function is received from the source eNB includes that: for the uplink radio bearer, after the context information of the primary user-plane function is received from the source eNB, the data packets are reordered according to the context information of reordering, and the data packets are sent to the upper-layer network in order; and/or for the downlink radio bearer, after the context information of the primary user-plane function is received from the source eNB, the data packets are numbered, and the numbered data packets are sent to the user-plane address of the eNB including the secondary user-plane function.

Herein, if a control-plane primary eNB after relocation is the target eNB, after the relocation REQACK message configured to acknowledge that the eNB is the primary eNB after relocation is returned to the source eNB, the target eNB further initiates a route handoff process configured to notify the upper-layer network to handoff a route to the target eNB; and if the control-plane primary eNB after relocation is another eNB, after the relocation REQACK message configured to acknowledge that the eNB is the primary eNB after relocation is returned to the source eNB, the target eNB further notifies said another eNB to initiate the route handoff process configured to notify the upper-layer network to handoff the route to the target eNB.

Herein, if the target eNB is a newly added eNB, the context information of the UE contained in the relocation REQ message sent to the target eNB by the source eNB further includes: configuration information of the secondary user-plane function of the UE on the source eNB.

Herein, if the source eNB is not an SeNB after relocation any more, after the target eNB completes the route handoff process with the upper-layer network, the method further includes that: the target eNB notifies the source eNB to delete the context information of the UE.

Herein, different radio bearers correspond to the same or different user-plane primary eNBs, and a primary eNB corresponding to a user plane of the same bearer is the same as or different from a primary eNB corresponding to a control plane.

Figure 6:
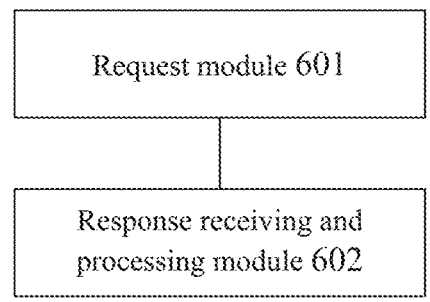
FIG. 6 is a structure diagram of a source eNB for performing cellular network relocation according to an embodiment of the disclosure.

As shown in FIG. 6, an embodiment of the disclosure provides a source eNB for performing cellular network relocation, which includes:

a request module 601, configured to: send, to a target eNB for relocation, a relocation REQ message configured to instruct the target eNB to execute a primary user-plane function, the relocation REQ message containing context information of UE on the source eNB; and a response receiving and processing module 602, configured to: after receiving a relocation REQACK message returned by the target eNB and configured to acknowledge that the target eNB is a primary eNB after relocation, send context information of the primary user-plane function on the eNB to the target eNB, and stop executing the primary user-plane function, herein the relocation REQACK message contains a user-plane address for the target eNB to receive data packets after relocation.

The source eNB may further include the following characteristics.

Herein, the source eNB is a user-plane primary eNB, and the target eNB is an SeNB:

a secondary user-plane function of the SeNB keeps being executed in a relocation process; and if the source eNB includes the secondary user-plane function, the secondary user-plane function of the source eNB keeps being executed in the relocation process.

Herein, for an uplink radio bearer, the primary user-plane function includes: reordering data packets sent from the UE and processed by the secondary user-plane function; and for a downlink radio bearer, the primary user-plane function includes: numbering data packets from an upper-layer network; and the secondary user-plane function further includes one or more of the following functions: a security function, an RLC protocol stack function, a MAC protocol stack function and a PHY protocol stack function.

Herein, the context information of the UE on the source eNB includes at least one of: configuration information of the primary user-plane function, capability information of the UE, control-plane and user-plane address information of the upper-layer network, bearer configuration information sent to the source eNB by the upper-layer network and a user-plane address for the SeNB to receive data packets after relocation.

Herein, the response receiving and processing module 602 is configured to: for the uplink radio bearer, after receiving the relocation REQACK message sent by the target eNB, further including: send a relocation notification message to another SeNB other than the target eNB, the relocation notification message being configured to notify the primary eNB to be relocated from the source eNB to the target eNB and containing the user-plane address for the target eNB to receive the data packets.

Herein, for the uplink radio bearer, the context information, sent to the target eNB by the source eNB, of the primary user-plane function includes: context information of reordering of the data packets by the primary user-plane function.

Herein, for the downlink radio bearer, the context information, sent to the target eNB by the source eNB, of the primary user-plane function includes: context information of numbering of the data packets by the primary user-plane function.

Herein, the context information of numbering of the data packets by the primary user-plane function includes: a first SN which may be allocated to a data packet by the target eNB after relocation or a last SN which is allocated to a data packet by the primary user-plane function of the eNB.

Herein, the response receiving and processing module 602 is configured to: for the uplink radio bearer, after sending the context information of the primary user-plane function to the target eNB, further including:

send data packets processed by the secondary user-plane function of the eNB and/or received data packets processed by the other SeNB to the target eNB.

Herein, the response receiving and processing module 602 is configured to: for the downlink radio bearer, after sending the context information of the primary user-plane function to the target eNB, further including:

send data packets sent from the upper-layer network and not yet numbered by the primary user-plane function to the target eNB, and/or locally cache data packets sent from the upper-layer network, numbered by the primary user-plane function but not yet sent to another SeNB other than the SeNB, process the cached data packets using the secondary user-plane function on the source eNB and send the processed data packets to the UE.

Herein, if the target eNB is a newly added eNB, the context information of the UE contained in the relocation REQ message sent to the target eNB by the source eNB further includes: configuration information of the secondary user-plane function of the UE on the source eNB.

Herein, if the target eNB is a newly added eNB, the response receiving and processing module 602 is configured to: after receiving the relocation REQACK message sent by the target eNB, further including:

if a control-plane primary eNB before relocation is started is the source eNB, initiate an RRC reconfiguration process between the source eNB and the UE, and if the control-plane primary eNB before relocation is started is another eNB, notify said another eNB to initiate an RRC reconfiguration process between said another eNB and the UE, herein, in the RRC reconfiguration process, the UE is notified that the user-plane primary eNB is relocated from the source eNB to the target eNB, and configuration information of the secondary user-plane function of the target eNB is sent to the UE.

Herein, the response receiving and processing module 602 is configured to: if the source eNB is not an SeNB after relocation any more, in the RRC reconfiguration process with the UE, further including: notify the UE that the eNB is not an SeNB any more.

Herein, the response receiving and processing module 602 is configured to: after receiving the relocation REQACK message sent by the target eNB, further including: send an RRC message configured to notify the UE that the primary eNB is relocated from the source eNB to the target eNB to the UE.

Herein, different radio bearers correspond to the same or different user-plane primary eNBs, and a primary eNB corresponding to a user plane of the same bearer is the same as or different from a primary eNB corresponding to a control plane.

Figure 7:
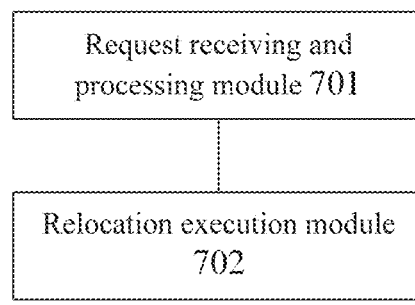
FIG. 7 is a structure diagram of a target eNB for performing cellular network relocation according to an embodiment of the disclosure.

As shown in FIG. 7, an embodiment of the disclosure provides a target eNB for performing cellular network relocation, which includes:

a REQ receiving and processing module 701, configured to, after receiving a relocation REQ message configured to instruct the target eNB to execute a primary user-plane function from a source eNB, return, to the source eNB, a relocation REQACK message configured to acknowledge that the eNB is a primary eNB after relocation, herein the relocation REQACK message contains a user-plane address for the target eNB to receive data packets after relocation, and the relocation REQ message contains context information of UE on the source eNB; and a relocation execution module 702, configured to: after receiving context information of the primary user-plane function from the source eNB, execute the primary user-plane function.

The target eNB may further include the following characteristics.

Herein, the source eNB is a user-plane primary eNB, and the target eNB is an SeNB;

a secondary user-plane function of the SeNB keeps being executed in a relocation process; and if the source eNB includes the secondary user-plane function, the secondary user-plane function of the source eNB keeps being executed in the relocation process.

Herein, the target eNB is an SeNB which has worked before relocation is initiated or a newly added eNB.

Herein, for an uplink radio bearer, the primary user-plane function includes: reordering data packets sent from the UE and processed by the secondary user-plane function; and for a downlink radio bearer, the primary user-plane function includes: numbering data packets from an upper-layer network; and the secondary user-plane function further includes one or more of the following functions: a security function, an RLC protocol stack function, a MAC protocol stack function and a PHY protocol stack function.

Herein, the context information of the UE on the source eNB includes at least one of: configuration information of the primary user-plane function, capability information of the UE, control-plane and user-plane address information of the upper-layer network, bearer configuration information sent to the source eNB by the upper-layer network and a user-plane address for the SeNB to receive data packets after relocation.

Herein, an SeNB after relocation includes: the source eNB and/or another SeNB.

Herein, the REQ receiving and processing module 701 is configured to: after receiving the relocation REQ message, further including: store the context information of the UE received from the relocation REQ message.

Herein, the REQ receiving and processing module 701 is configured to: for the uplink radio bearer, after sending the relocation REQACK message to the source eNB, further including: locally cache data packets processed by the eNB, and/or receive data packets processed by the secondary user-plane function of the other SeNB.

Herein, for the uplink radio bearer, the context information, sent to the target eNB by the source eNB, of the primary user-plane function includes: context information of reordering of the data packets by the primary user-plane function.

Herein, for the downlink radio bearer, the context information, sent to the target eNB by the source eNB, of the primary user-plane function includes: context information of numbering of the data packets by the primary user-plane function.

Herein, the context information of numbering of the data packets by the primary user-plane function includes: a first SN which may be allocated to a data packet by the target eNB after relocation or a last SN which is allocated to a data packet by the primary user-plane function of the eNB.

Herein, the relocation execution module 702 is configured to, after receiving the context information of the primary user-plane function from the source eNB, execute the primary user-plane function, including: for the uplink radio bearer, after receiving the context information of the primary user-plane function from the source eNB, reordering the data packets according to the context information of reordering, and sending the data packets to the upper-layer network in order; and/or for the downlink radio bearer, after receiving the context information of the primary user-plane function from the source eNB, numbering the data packets, and sending the numbered data packets to the user-plane address of the eNB including the secondary user-plane function.

Herein, the target eNB further includes a route handoff processing module, and the route handoff processing module is configured to: if a control-plane primary eNB after relocation is the target eNB, after returning, to the source eNB, the relocation REQACK message configured to acknowledge that the eNB is the primary eNB after relocation, initiating a route handoff process configured to notify the upper-layer network to handoff a route to the target eNB; and if the control-plane primary eNB after relocation is another eNB, after returning, to the source eNB, the relocation REQACK message configured to acknowledge that the eNB is the primary eNB after relocation, notifying said another eNB to initiate the route handoff process configured to notify the upper-layer network to handoff the route to the target eNB.

Herein, if the target eNB is a newly added eNB, the context information of the UE contained in the relocation REQ message sent to the target eNB by the source eNB further includes: configuration information of the secondary user-plane function of the UE on the source eNB.

Herein, the relocation execution module 702 is configured to: if the source eNB is not an SeNB after relocation any more, after the target eNB completes the route handoff process with the upper-layer network, further including: notify, by the target eNB, the source eNB to delete the context information of the UE.

Herein, different radio bearers correspond to the same or different user-plane primary eNBs, and a primary eNB corresponding to a user plane of the same bearer is the same as or different from a primary eNB corresponding to a control plane.

Embodiment 1

Figure 8:
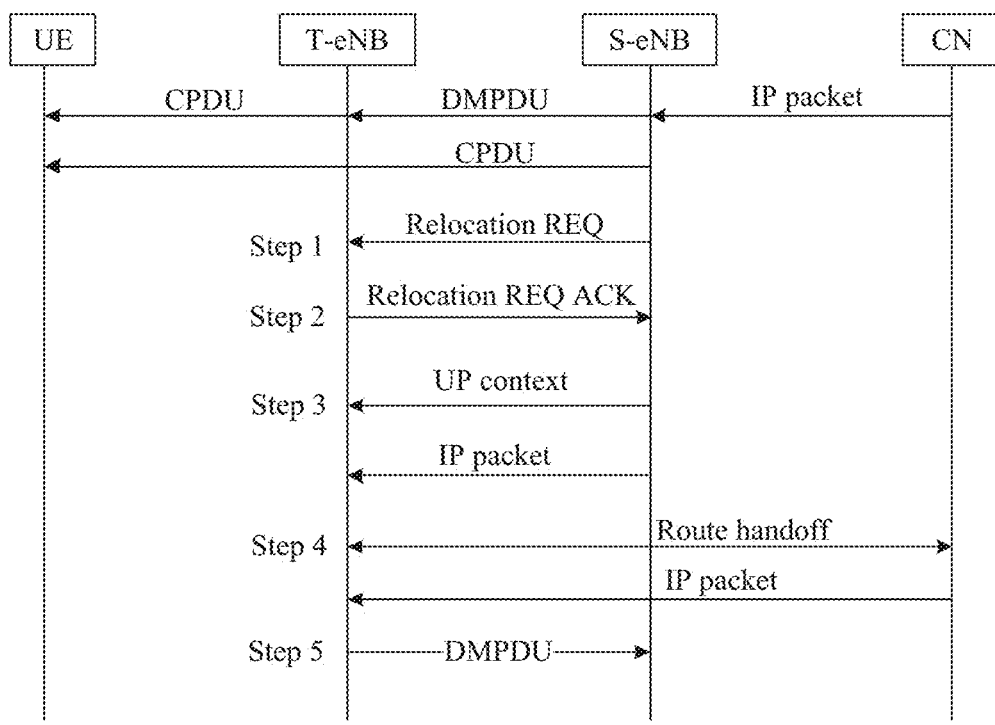
FIG. 8 is a schematic diagram of information interaction of a downlink according to embodiment 1 of the disclosure.

As shown in FIG. 8, an S-eNB is a current primary eNB, and is also a source eNB for relocation. A T-eNB is a current SeNB, and is also a target eNB for relocation.

A DMPDU refers to a PDU obtained after processing (for example, SN allocation) of a primary user-plane module; a CPDU refers to a PDU obtained after processing (for example, ciphering) of a secondary user-plane module; and the primary eNB, after receiving an IP packet from an upper-layer network, allocates an SN to the IP packet to obtain the DMPDU by virtue of the primary user-plane module.

Before a relocation step is started, the S-eNB is required to forward the DMPCU to the T-eNB.

In Step 1, the S-eNB notifies the T-eNB in a relocation REQ to exchange a role of the primary eNB to the T-eNB, that is, the T-eNB is notified to execute a primary user-plane function, but its secondary user-plane function is kept. This message further includes a UE context of UE on the S-eNB.

Herein, the UE context includes, but not limited to, configuration information of the primary user-plane function, UE capability information of the UE, control-plane and user-plane address information of the upper-layer network, bearer configuration information sent to the S-eNB by the upper-layer network and a user-plane address for an SeNB after relocation to receive data packets, herein the SeNB after relocation includes the current S-eNB and another SeNB.

In Step 2, the T-eNB, after receiving the relocation REQ message of the S-eNB, stores the contents mentioned in Step 1, and returns a message acknowledging that it becomes a new primary eNB, i.e. a relocation REQ ACK message. The message includes, but not limited to, a user-plane address for the T-eNB to receive data packets later.

In Step 3, the S-eNB, after receiving the ACK message of the T-eNB, sends a context of the primary user-plane function to the S-eNB, and stops executing the primary user-plane function. Then, the S-eNB forwards received IP packets (PDUs not processed by the primary user-plane function) to the T-eNB. DMPDUs which have been generated are not forwarded to other eNBs including the T-eNB, and instead, these DMPDUs are directly converted into CPDUs so as to be sent to the UE.

Herein, the primary user-plane context includes, but not limited to, a first SN which may be allocated by the T-eNB (or a last SN which is allocated by the S-eNB).

In Step 4, the T-eNB initiates a route handoff process on an interface with the upper-layer network, and notifies the upper-layer network to handoff routes of the transmitted IP packets onto the T-eNB, and the upper-layer network starts routing the IP packets onto the T-eNB after the route handoff process is ended.

In Step 5, the T-eNB starts executing the primary user-plane function. The T-eNB starts forwarding the DMPDUs according to the user-plane addresses of the S-eNB and the other SeNB in the relocation REQ message.

Herein, a sequence between Step 3 and Step 4 is not strictly regulated, and Step 5 may be started to be executed after Step 3.

In all of the step processes, the secondary user-plane function on a wireless interface of each eNB may keep being continuously executed, that is, no protocol stack resetting operation is performed, and a key configuration parameter, for example, a ciphering/deciphering parameter related to security (for example, a key and a ciphering/deciphering algorithm) is not changed. The T-eNB may send an RRC message to the UE to notify the UE that the latest primary eNB is handoffed from the S-eNB to the T-eNB. This is just a control-plane flow, that is, there is no influence on a user-plane operation of any wireless interface. A primary eNB relocation function realized by such a method is a nondestructive and seamless process.

Embodiment 2

Figure 9:
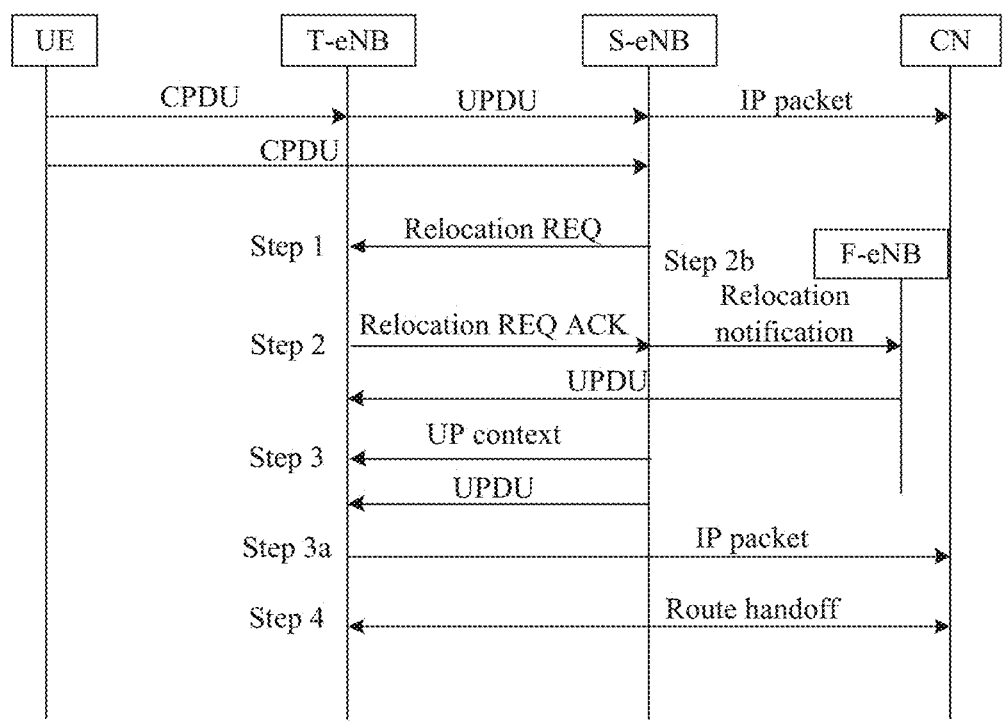
FIG. 9 is a schematic diagram of information interaction of an uplink according to embodiment 2 of the disclosure.

As shown in FIG. 9, when UE is configured with an uplink radio bearer, a flow is as follows, and compared with an uplink flow in embodiment 1, the following changes are made.

Step 1 is the same as Step 1 of embodiment 1.

Step 2 is the same as Step 2 of embodiment 1.

In addition, a T-eNB, after sending a relocation REQ ACK message, does not forward UPDUs to an S-eNB, but locally caches it.

Herein, the UPDUs are PDUs obtained by processing (for example, deciphering) CPDUs from the UE through a secondary user-plane module.

In Step 2a, the S-eNB, after receiving the relocation REQ ACK message, notifies another SeNB that a primary eNB has been handoffed from the S-eNB to the T-eNB through a relocation notification message, and also forwards a user-plane address for the T-eNB to receive data packets to the other SeNB. The other SeNB, after receiving the notification message, forwards the UPDUs to the T-eNB, and does not forward it to the S-eNB.

In Step 3, the S-eNB sends a control parameter of a reordering buffer to the T-eNB through an UP context, and forwards it to the T-eNB from UPDUs of its own and received from the other SeNB. The T-eNB starts executing a UPDU reordering function according to a received reordering context.

In Step 3a, the T-eNB sends IP packets to the upper-layer network in order.

Step 4 is the same as Step 4 of embodiment 1.

Embodiment 3

Figure 10:
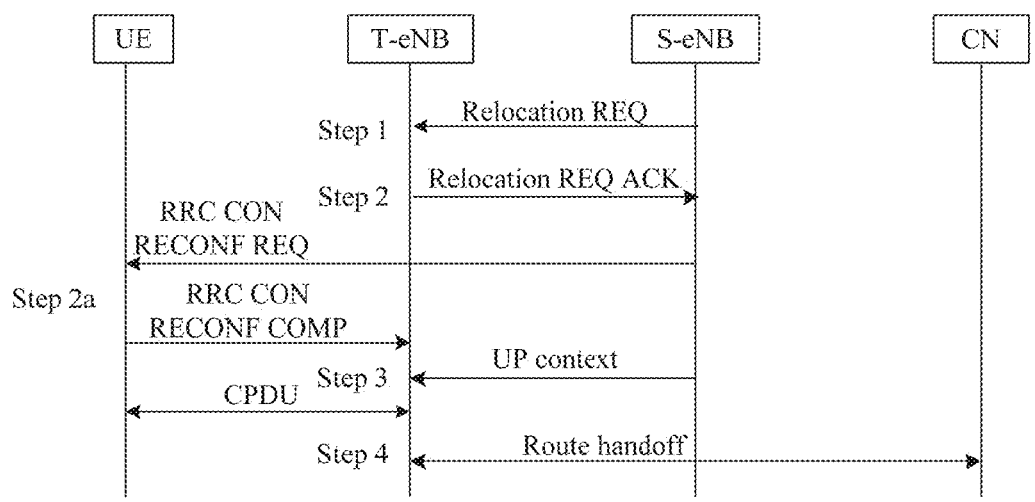
FIG. 10 is a schematic diagram of information interaction (a target eNB is a newly added SeNB) according to embodiment 3 of the disclosure.

As shown in FIG. 10, when a T-eNB is a newly added eNB, it is necessary to combine an eNB addition process and a process of handoffing the eNB into a primary eNB on a wireless interface. A flow is as follows, and compared with flows in embodiment 1 and embodiment 2, has the following differences.

In Step 1, compared with Step 1 of embodiment 1 and embodiment 2, a context of UE may further include, but not limited to, configuration information of a secondary user-plane function of the UE on an S-eNB, besides contents specified in embodiment 1.

In Step 2, compared with Step 2 of embodiment 1 and embodiment 2, a relocation REQ ACK message further includes configuration information of a secondary user-plane function on the T-eNB.

In Step 2a, compared with Step 2a of embodiment 2, the following operation is further included: the S-eNB and the UE execute an RRC reconfiguration process. This reconfiguration process may send the configuration information of the secondary user-plane function of the T-eNB in Step 2 to the UE, and may notify the UE that a primary eNB has been handoffed from the S-eNB to the T-eNB. In the RRC reconfiguration process, the UE establishes a wireless connection with the T-eNB. An RRC CON RECONF COMP message (RRC connection reconfiguration completion message) of the UE is sent to the new primary eNB from the UE.

In Step 3, a downlink flow is the same as Step 3 of embodiment 1, an uplink flow is the same as Step 3 of embodiment 2, and the following operation is further included: the T-eNB starts sending/receiving CPDUs on wireless interfaces.

Step 4 is the same as Step 4 of embodiment 1 and embodiment 2.

Step 5 is the same as Step 5 of embodiment 1.

Embodiment 4

If an S-eNB is not an SeNB after the flow of embodiment 1 or embodiment 2 or embodiment 3 is ended, that is, it is required to be deleted, such information may be notified to UE in Step 2a of embodiment 3. After receiving an RRC reconfiguration message, the UE does not perform data communication with the eNB on a wireless interface. In addition, after route handoff of Step 4 is completed, a new primary eNB may notify the SeNB to delete a context of the UE.

Embodiment 5

Figure 11:
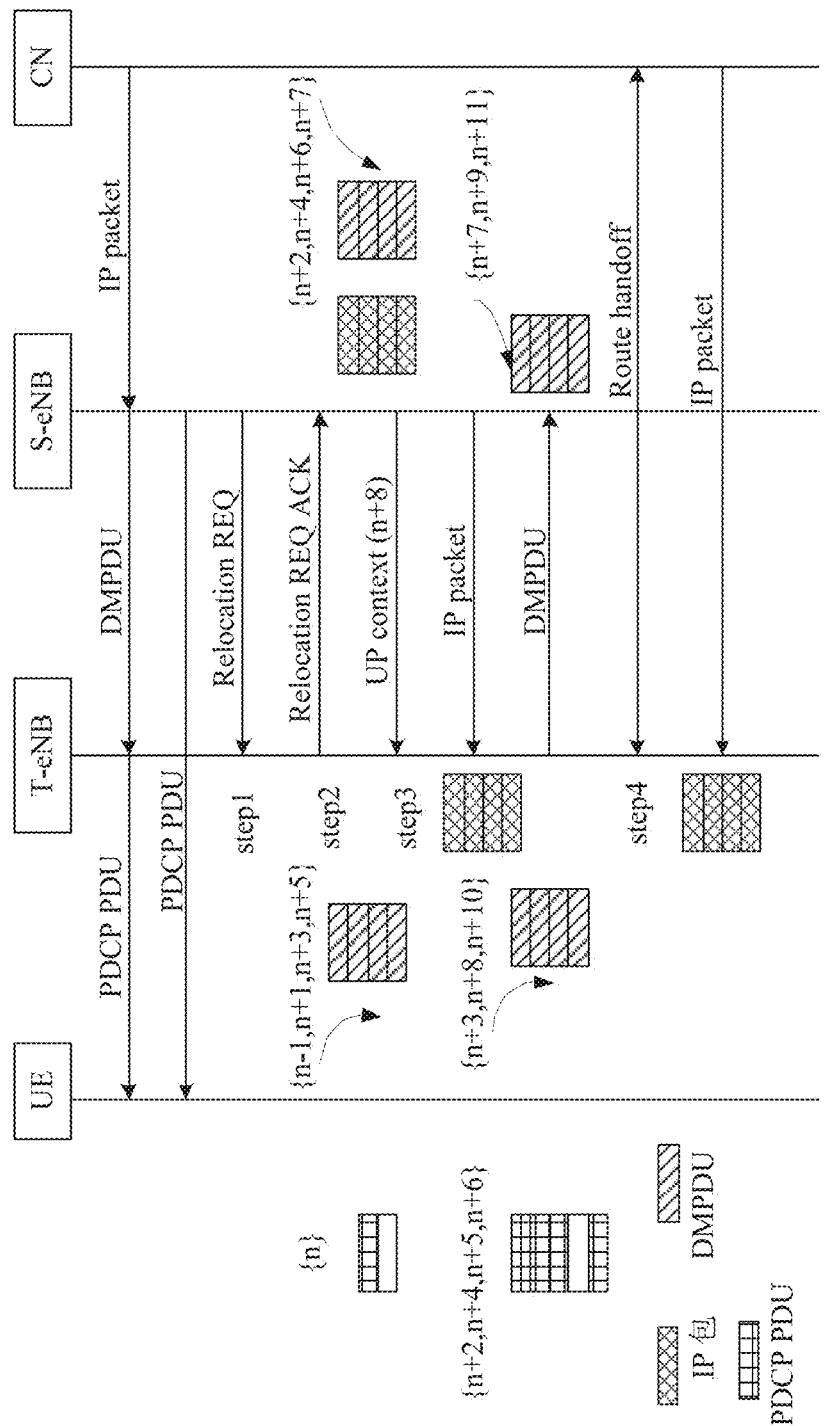
FIG. 11 is a schematic diagram of information interaction of a downlink according to embodiment 5 of the disclosure.

As shown in FIG. 11, for a downlink flow, in this example, a ciphered DMPDU is called as a PDCP PDU, and keeps a data packet SN consistent with the DMPDU.

In Step 2, an SN of a PDCP PDU received by UE is n, and because a previous PDCP PDU n−1 has not yet been received, a receiver of the UE stores the PDCP PDU in a reordering buffer. SNs of DMPDUs cached by a T-eNB are {n−1,n+1,n+3,n+5} respectively, and SNs of DMPDUs cached by an S-eNB are {n+2,n+4,n+6,n+7}.

The S-eNB is required to send a primary user-plane context, which refers to a first SN for numbering a DMPDU by the T-eNB herein, i.e. n+8, to the T-eNB. The S-eNB further sends cached IP packets to the T-eNB when sending the primary user-plane context, but continues caching the DMPDUs of the related technology.

The T-eNB, after receiving the primary user-plane context {n+8}, starts executing a primary user-plane function, starts generating a DMPDU, and sends it to other SeNBs, including the S-eNB. In this process, PDCP PDUs of wireless interfaces keep being sent, and at this moment, the UE caches PDCP PDUs {n+2,n+4,n+5,n+6}. DMPDUs originally numbered to be {n+3} and newly numbered to be {n+8,n+10} are cached on the T-eNB. DMPDUs of originally kept {n+7} and newly received {n+9,n+11} are cached on the S-eNB.

After route handoff of Step 4, the T-eNB obtains the IP packets from a core network.

Embodiment 6

Figure 12:
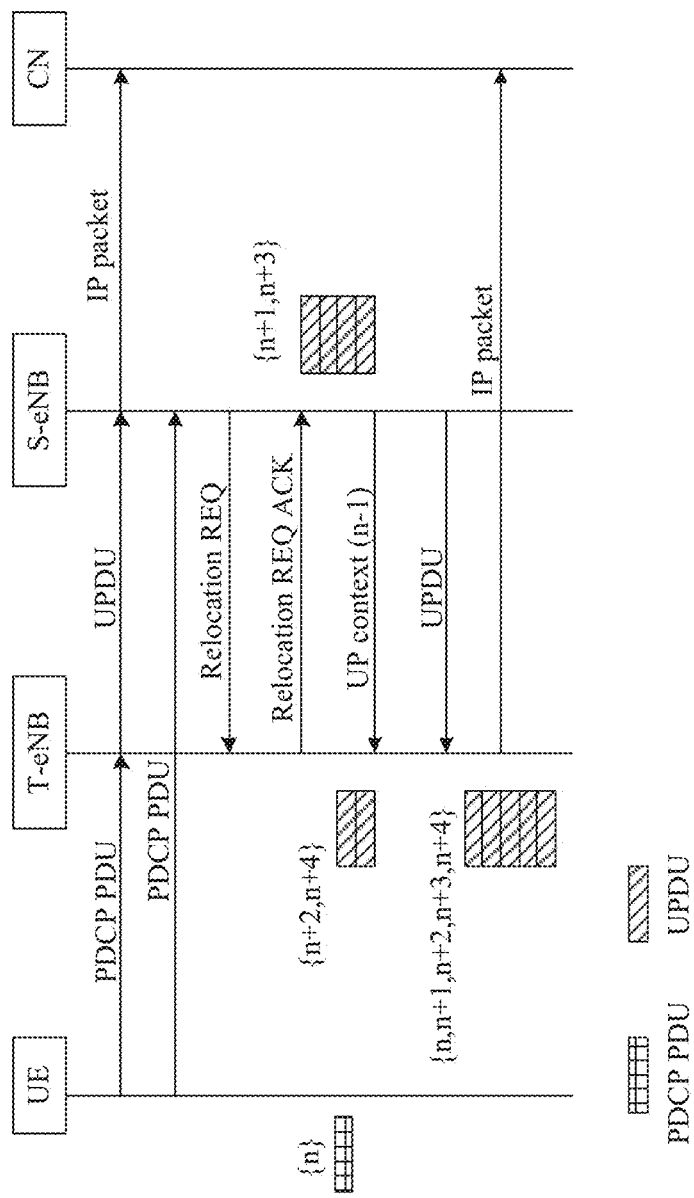
FIG. 12 is a schematic diagram of information interaction of an uplink according to embodiment 6 of the disclosure.

As shown in FIG. 12, for an uplink flow, in this example, a ciphered PDU sent by UE is called as a PDCP PDU.

When an S-eNB receives an ACK message of a T-eNB in Step 2. UPDUs {n+1,n+3} are stored in a reordering buffer of the S-eNB, and this is because the UE has not yet sent a PDCP PDU with an SN {n} and the T-eNB has not yet forwarded processed UPDUs {n+2,n+4} to the S-eNB. From then on, the T-eNB continues storing the two UPDUs {n+2,n+4}, and continues receiving PDCP PDUs of wireless interfaces.

The S-eNB sends the context information of reordering (for example, an SN, which is n−1 herein, of a last IP packet transmitted to a core network) to the T-eNB through an UP context, and also sends cached UPDUs with SNs {n+1,n+3} to the T-eNB. At this moment, the T-eNB also receives the PDCP PDU with the SN {n}, reorders all the cached UPDUs to be {n,n+1,n+2,n+3,n+4} according to the reordering context, i.e. the SN {n−1} of the last IP packet sent to the core network, sent by the S-eNB, and transmits the IP packets to the core network in order.

Embodiment 7

Figure 13:
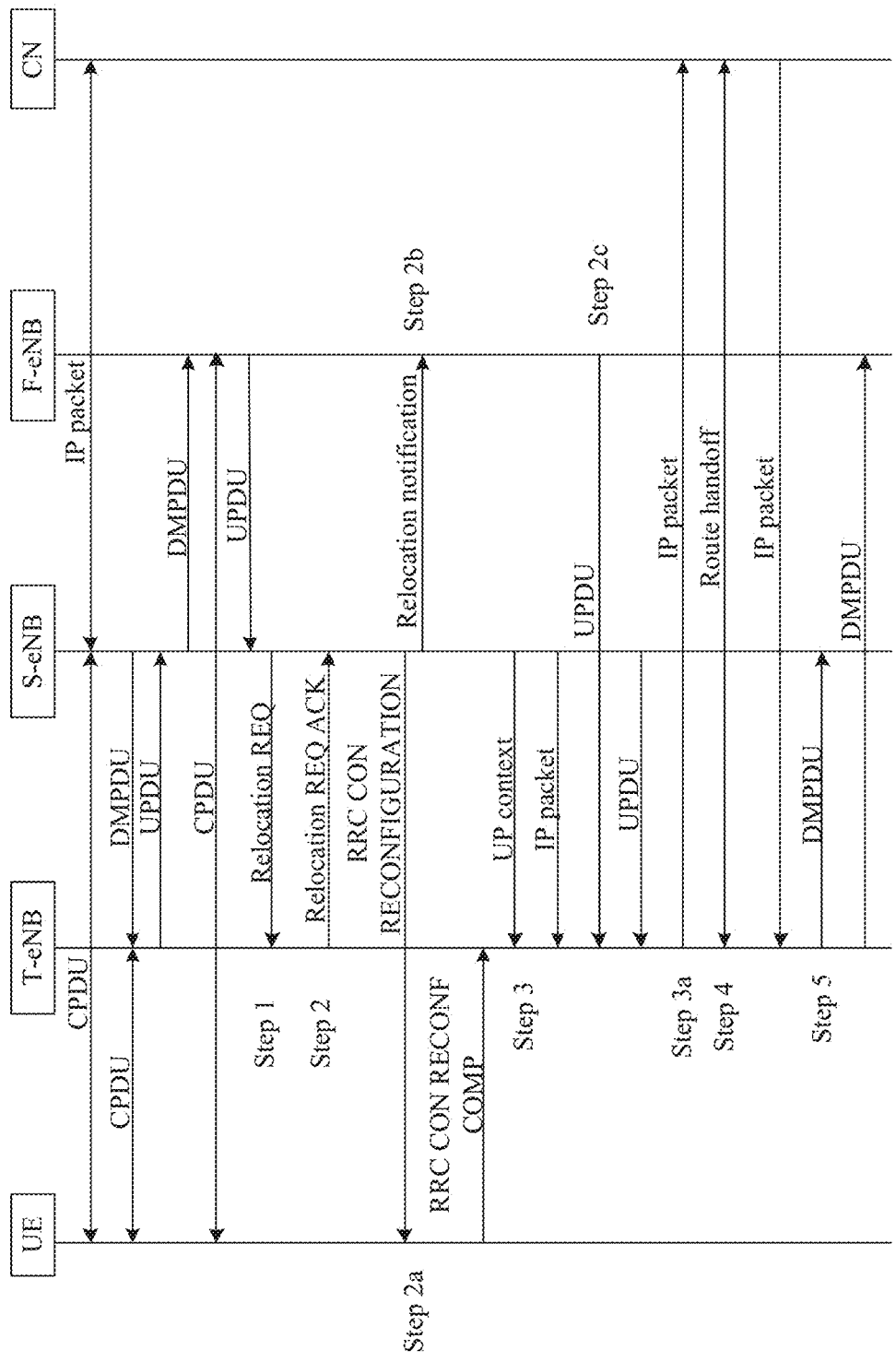
FIG. 13 is a schematic diagram of information interaction (including an uplink and a downlink) according to embodiment 7 of the disclosure.

As shown in FIG. 13, a combined flow of relocation to an SeNB (uplink and downlink) which is working includes the following steps.

In Step 1, an S-eNB notifies a T-eNB in a relocation REQ to exchange a role of a primary eNB to the T-eNB, that is, the SeNB is notified to execute a primary user-plane function, but its secondary user-plane function is kept. This message further includes a UE context of UE on the S-eNB.

Herein, the UE context includes, but not limited to, configuration information of the primary user-plane function, a UE capability of the UE, control-plane and user-plane address information of an upper-layver network, bearer configuration information sent to the S-eNB by the upper-layer network and a user-plane address for the SeNB after relocation to receive data packets. The SeNB after relocation includes the current S-eNB and another SeNB.

In Step 2, the T-eNB, after receiving the relocation REQ message of the S-eNB, stores the contents mentioned in Step 1, and returns a message acknowledging that it becomes a new primary eNB, i.e. a relocation REQ ACK message. The message includes, but not limited to, a user-plane address for the T-eNB to receive data packets later.

Herein, for an uplink flow, the T-eNB, after sending the relocation REQ ACK message, does not forward UPDUs to the S-eNB, but locally caches them.

In Step 2a, (optionally) the S-eNB, after receiving the relocation REQ ACK message, notifies, on a wireless interface through an RRC message, the UE of a message indicating that the primary eNB is changed. This message may further include configuration information of a PCell on the primary eNB.

In Step 2b, (optionally), the S-eNB, after receiving the relocation REQ ACK message, if there are other SeNBs (F-eNBs) besides the T-eNB and the UE is configured with an uplink radio bearer, sends a relocation notification message to these SeNBs, a notification content including configuration information of the new primary eNB, including, but not limited to, a user-plane address of the new primary eNB.

There is no sequential order between Step 2b and Step 2a.

In Step 2c, the SeNBs receiving the notification message start forwarding received UPDUs to the new primary eNB.

In Step 3, the S-eNB, after receiving the ACK message of the T-eNB, sends a context of the primary user-plane function to the S-eNB, and stops executing the primary user-plane function. Then, for a downlink flow, the S-eNB forwards received IP packets to the T-eNB. DMPDUs which have been generated are not forwarded to other eNBs including the T-eNB, and instead, these DMPDUs are directly converted into CPDUs so as to be sent to the UE. For the uplink flow, the S-eNB forwards UPDUs in a reordering buffer to the T-eNB. The T-eNB starts a UPDU reordering function according to a received reordering context.

Herein, the context of the primary user-plane function, for an uplink radio bearer, includes, but not limited to, a first SN which may be allocated by the T-eNB (or a last SN which is allocated by the S-eNB), and for a downlink radio bearer, includes, but not limited to, a control parameter for reordering.

In Step 3a, for the uplink flow, the T-eNB starts sending the IP packets to the upper-layer network.

In Step 4, the T-eNB initiates a route handoff process on an interface with the upper-layer network, and notifies the upper-layer network to handoff routes of the transmitted IP packets onto the T-eNB, and the upper-layer network starts routing the IP packets onto the T-eNB after the route handoff process is ended.

A sequence between Step 3 and Step 4 is not strictly regulated.

In Step 5, the T-eNB generates DMPDUs, and starts forwarding the DMPDUs according to the user-plane addresses of the S-eNB and the other SeNBs in the relocation REQ message.

Step 5 is started to be executed after Step 3.

It is important to note that the abovementioned flows are all described from an uplink or downlink of a radio bearer or an uplink and downlink of a radio bearer. Moreover, the primary eNB is a user-plane and control-plane primary eNB, that is, communication with the UE and the upper-layer network is implemented through the original primary eNB or the new primary eNB.

Embodiment 8

Figure 14:
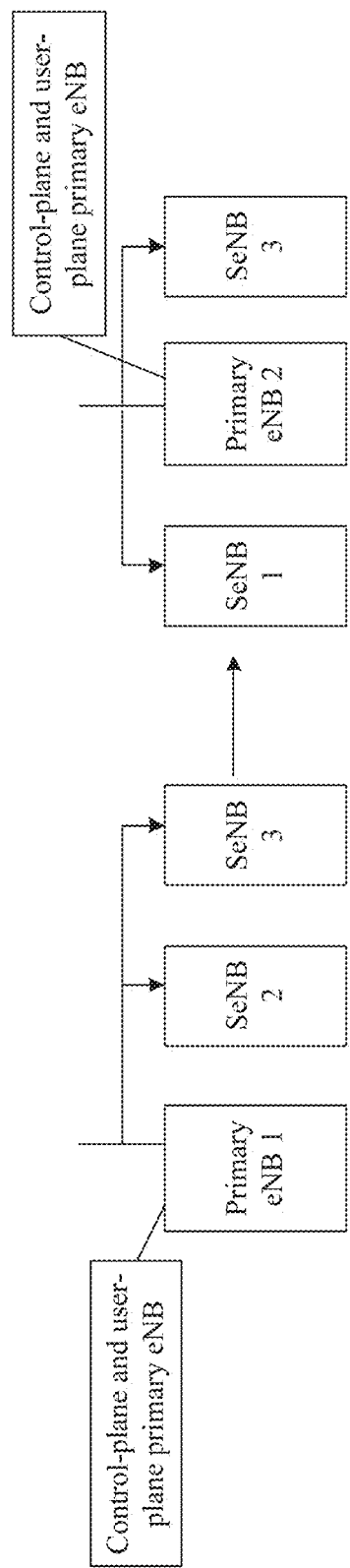
FIG. 14 is a schematic diagram of relocation of an eNB according to embodiment 8 of the disclosure.

As shown in FIG. 14, a control-plane primary eNB and user-plane primary eNB of a radio bearer are simultaneously relocated from an eNB 1 to an eNB 2. This is a model in all of the abovementioned examples.

Furthermore, there may be a more flexible implementation mode. Different radio bearers may have different primary eNBs, and then, when a primary eNB of a bearer is changed, a primary eNB of another bearer may keep being unchanged. In addition, a user-plane primary eNB and a control-plane primary eNB may be separated, and when the user-plane primary eNB is changed, the control-plane primary eNB may keep being unchanged.

Embodiment 9

Figure 15:
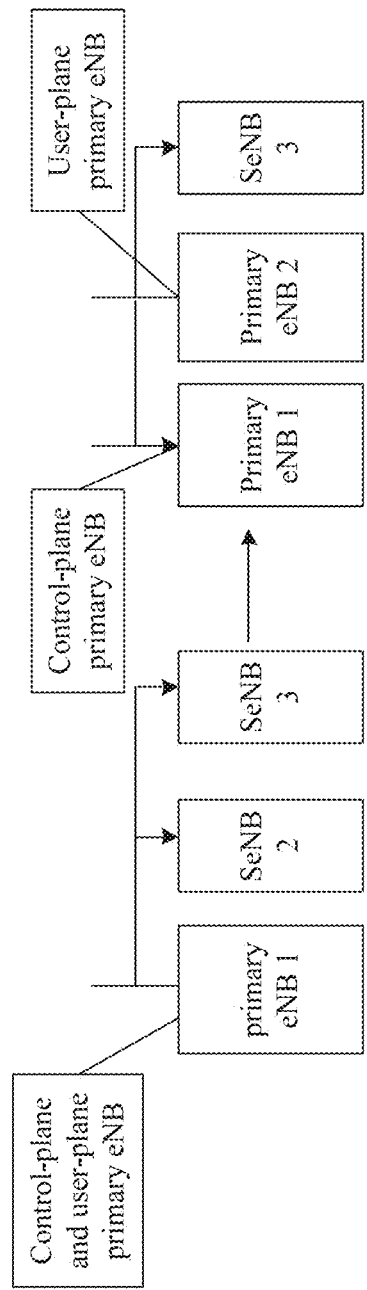
FIG. 15 is another schematic diagram of relocation of an eNB according to embodiment 9 of the disclosure.

As shown in FIG. 15, a user-plane primary eNB of a radio bearer is relocated from an eNB 1 to an eNB 2, but a control-plane primary eNB is kept at the eNB 1. This means that RRC signaling with UE is sent from the eNB 1 and is also received by the eNB 1 in a relocation process. Moreover, after the eNB 1 obtains a relocation REQ ACK message of the eNB 2, a route handoff process is also completed not by the eNB 2 but by the eNB 1.

Referring to FIG. 13, in the example, the eNB 1 corresponds to the S-eNB, the eNB 2 corresponds to the T-eNB, and the other SeNBs (for example, an eNB 3) corresponds to the F-eNB.

In Step 2a, an RRC CON CONF COMP message may be sent to the S-eNB, and route handoff occurs between the S-eNB and the upper-layer network. For coordination with this change, in Step 2, the T-eNB is required to notify a user-plane address for receiving IP packets to the S-eNB, and the S-eNB is required to notify the address to the upper-layer network in a route handoff process, so that IP packets after Step 4 are routed not to the S-eNB but to the T-eNB from the upper-layer network.

Embodiment 10

Figure 16:
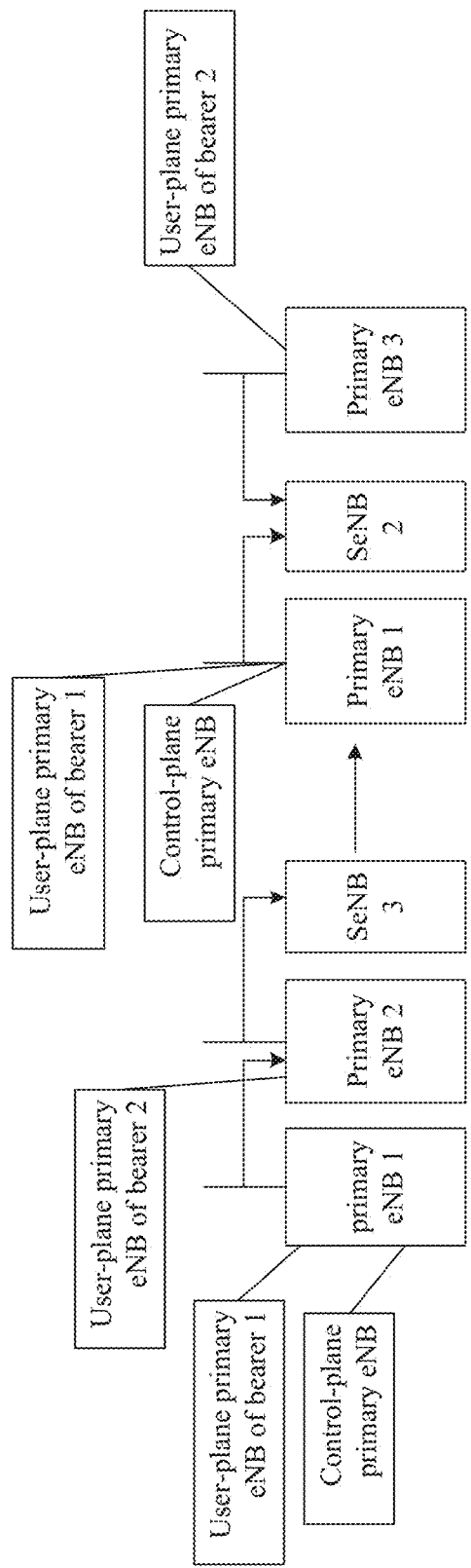
FIG. 16 is another schematic diagram of relocation of an eNB according to embodiment 10 of the disclosure.

As shown in FIG. 16, an eNB 1 (eNB1) is a control-plane primary eNB, and is also a user-plane primary eNB of a bearer 1. An eNB 2 (eNB2) is an SeNB of the bearer 1, and is also a user-plane primary eNB of a bearer 2. An eNB 3 (eNB3) is an SeNB of the bearer 2. After relocation, the control-plane primary eNB and the user-plane primary eNB of the bearer 1 are both not changed, but the user-plane primary eNB of the bearer 2 is changed from the eNB 2 (eNB2) to the eNB 3 (eNB3), and then the eNB 2 becomes an SeNB of both the bearer 1 and the bearer 2.

Figure 17:
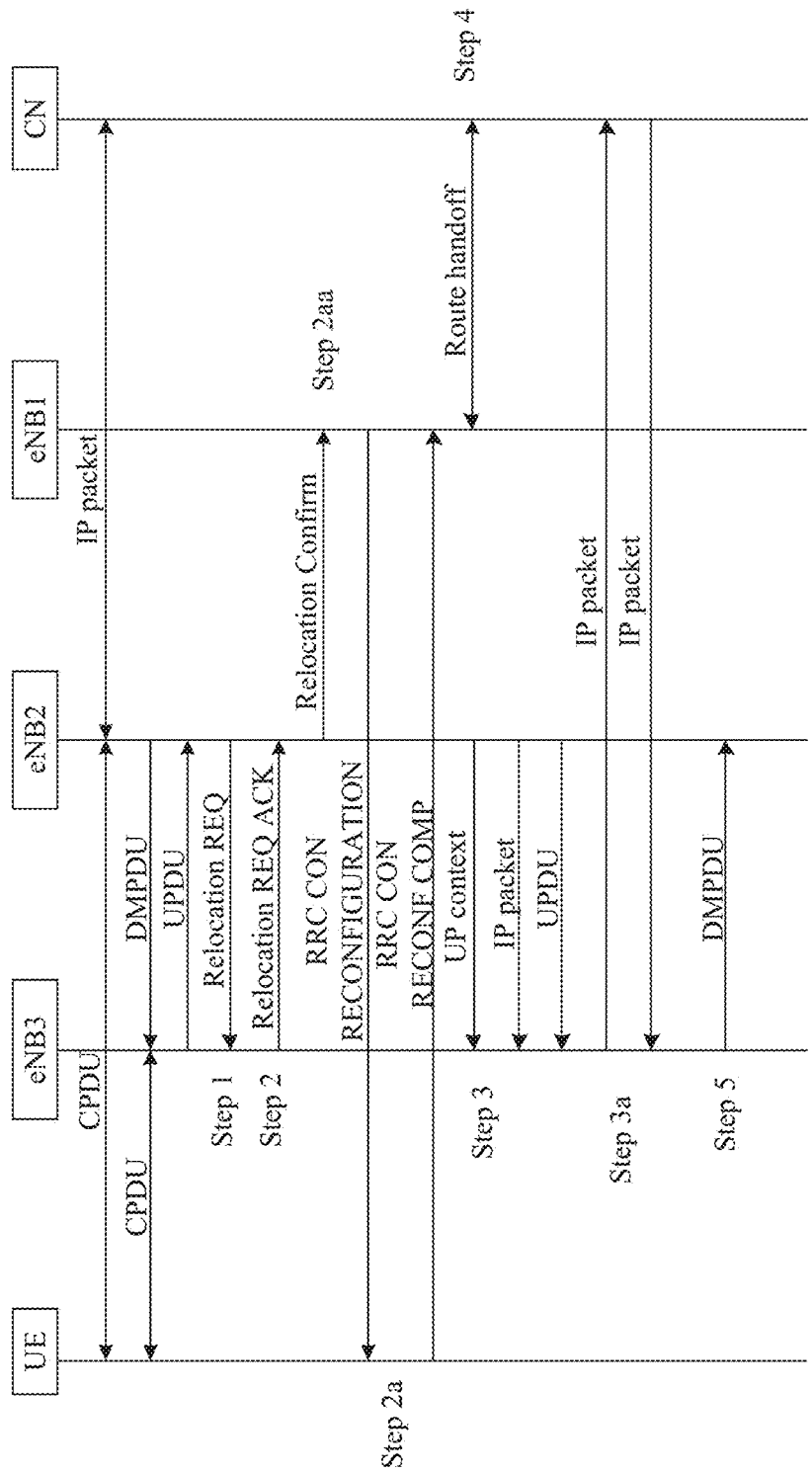
FIG. 17 is a schematic diagram of information interaction according to embodiment 10 of the disclosure.

In FIG. 17, a user plane only describes a change condition of the radio bearer 2, and a relocation confirm message is sent to the eNB1 by the eNB2, and includes a user-plane address for the eNB3 to receive IP packets. Of course, the message may also be sent to the eNB1 by the eNB3. The eNB1, after receiving the relocation confirm message, may initiate a route handoff process of Step 4, and there is no strict time relationship between this process and Step 2a and Step 3.

An embodiment of the disclosure further discloses a computer program, which includes a program instruction, the program instruction being executed by an eNB to enable the eNB to execute any abovementioned method for performing cellular network relocation on a source eNB side.

An embodiment of the disclosure further discloses a carrier carrying the computer program.

An embodiment of the disclosure further discloses a computer program, which includes a program instruction, the program instruction being executed by an eNB to enable the eNB to execute any abovementioned method for performing cellular network relocation on a target eNB side.

An embodiment of the disclosure further discloses a carrier carrying the computer program.

After the drawings and detailed descriptions are read and understood, the other aspects may be comprehended.

According to the method and eNB provided by the embodiments for performing cellular network relocation, the source eNB for relocation notifies the target eNB for relocation to execute the primary user-plane function, the source eNB stops executing the primary user-plane function on the eNB after receiving the ACK message fed back by the target eNB, and sends the context information of the primary user-plane function to the target eNB, and the target eNB executes the primary user-plane function after receiving the context information of the primary user-plane function, herein the primary user-plane function includes: a function of numbering the data packets received from the upper-layer network in a downlink direction and reordering the data packets from the UE in an uplink direction; and the secondary user-plane function includes: performing deciphering processing on the received data packets in the uplink direction and performing ciphering processing on the data packets in the downlink direction. In each embodiment of the disclosure, the secondary user-plane function on a wireless interface of each eNB keeps being continuously executed, that is, no protocol stack resetting operation is performed, and a key configuration parameter (for example, a ciphering/ deciphering parameter related to security) is not changed. Therefore, in the embodiments of the disclosure, user-plane interruptions may be avoided when the UE moves in a high-density microcellular network, and a primary eNB relocation function in the embodiments of the disclosure is a nondestructive and seamless process.

Those skilled in the art may understand that all or part of the steps in the abovementioned method may be implemented by instructing related hardware through a program, and the abovementioned program may be stored in a computer-readable storage medium, such as a Read-Only Memory (ROM), a magnetic disk or an optical disk. Optionally, all or part of the steps of the embodiments may also be implemented by virtue of one or more integrated circuits, and correspondingly, each module/unit in the embodiments may be implemented in form of hardware, and may also be implemented in form of software function module. The disclosure is not limited to any specific form of hardware and software combination.

It is important to note that the disclosure may further have various other embodiments, those skilled in the art may make various corresponding variations and transformations according to the disclosure without departing from the spirit and essence of the disclosure, but these corresponding variations and transformations shall all fall within the scope of protection of the appended claims of the disclosure.

INDUSTRIAL APPLICABILITY

The technical solutions of the disclosure may solve the problem of frequent user-plane interruption in a high-density microcellular network, and thus the disclosure has high industrial applicability.

The invention claimed is:

1. A method for performing cellular network relocation, applied to a source evolved Node B (eNB) for relocation, the method comprising:

sending, by the source eNB to a target eNB for relocation, a relocation Request (REQ) message configured to instruct the target eNB to execute a primary user-plane function, wherein the relocation REQ message contains context information of User Equipment (UE) on the source eNB; and after receiving a relocation REQ Acknowledgement (ACK) message returned by the target eNB and configured to acknowledge that the target eNB is a primary eNB after relocation, sending, by the source eNB, context information of the primary user-plane function on the source eNB to the target eNB, and stopping executing the primary user-plane function, wherein the relocation REQ ACK message contains a user-plane address for the target eNB to receive data packets after relocation, wherein the source eNB is a user-plane primary eNB, and the target eNB is a Secondary eNB (SeNB);

a secondary user-plane function of the SeNB keeps being executed in a relocation process; and if the source eNB comprises the secondary user-plane function, the secondary user-plane function of the source eNB keeps being executed in the relocation process, wherein for an uplink radio bearer, the primary user-plane function comprises: reordering data packets sent from the UE and processed by the secondary user-plane function; and for a downlink radio bearer, the primary user-plane function comprises: numbering data packets from an upper-layer network; and the secondary user-plane function comprises one or more of the following functions: a security function, a Radio Link Control (RLC) protocol stack function, a Media Access Control (MAC) protocol stack function and a Physical (PHY) protocol stack function.

2. The method for performing cellular network relocation according to claim 1, wherein for the uplink radio bearer, the context information, sent to the target eNB by the source eNB, of the primary user-plane function comprises: context information of reordering of the data packets by the primary user-plane function; and for the downlink radio bearer, the context information, sent to the target eNB by the source eNB, of the primary user-plane function comprises: context information of numbering of the data packets by the primary user-plane function.

3. The method for performing cellular network relocation according to claim 1, wherein the context information of the UE on the source eNB comprises at least one of:

configuration information of the primary user-plane function, capability information of the UE, control-plane and user-plane address information of an upper-layer network, bearer configuration information sent to the source eNB by the upper-layer network and a user-plane address for the SeNB to receive data packets after relocation, wherein if the target eNB is a newly added eNB, the context information of the UE contained in the relocation REQ message sent to the target eNB by the source eNB further comprises: configuration information of the secondary user-plane function of the UE on the source eNB.

4. The method for performing cellular network relocation according to claim 3, wherein if the target eNB is a newly added eNB, after the step of receiving, by the source eNB, the relocation REQ ACK message sent by the target eNB, the method further comprises:

if a control-plane primary eNB before relocation is started is the source eNB, initiating, by the source eNB, a Radio Resource Control (RRC) reconfiguration process between the source eNB and the UE, and if the control-plane primary eNB before relocation is started is another eNB, notifying, by the source eNB, said another eNB to initiate an RRC reconfiguration process between said another eNB and the UE, wherein in the RRC reconfiguration process, the UE is notified that the user-plane primary eNB is relocated from the source eNB to the target eNB, and configuration information of the secondary user-plane function of the target eNB is sent to the UE.

5. The method for performing cellular network relocation according to claim 1, wherein for the uplink radio bearer, after the step of receiving the relocation REQ ACK message sent by the target eNB, the method further comprises: sending a relocation notification message to another SeNB other than the target eNB, the relocation notification message being configured to notify the primary eNB to be relocated from the source eNB to the target eNB and the relocation notification message containing the user-plane address for the target eNB to receive the data packets.

6. The method for performing cellular network relocation according to claim 1, wherein for the uplink radio bearer, after the step of sending the context information of the primary user-plane function on the source eNB to the target eNB, the method further comprises:

sending, to the target eNB, data packets processed by the secondary user-plane function of the source eNB and/or received data packets processed by another SeNB; and for the downlink radio bearer, after the step of sending the context information of the primary user-plane function on the source eNB to the target eNB, the method further comprises:

sending, to the target eNB, data packets sent from the upper-layer network and not yet numbered by the primary user-plane function, and/or locally caching data packets sent from the upper-layer network, numbered by the primary user-plane function but not yet sent to another SeNB other than the SeNB, processing the cached data packets using the secondary user-plane function on the source eNB and sending the processed data packets to the UE.

7. A method for performing cellular network relocation, applied to a target evolved Node B (eNB), the method comprising:

after receiving a relocation Request (REQ) message configured to instruct the target eNB to execute a primary user-plane function from a source eNB, returning, by the target eNB to the source eNB, a relocation REQ Acknowledgement (ACK) message configured to acknowledge that the target eNB is a primary eNB after relocation, wherein the relocation REQ ACK message contains a user-plane address for the target eNB to receive data packets after relocation, and the relocation REQ message contains context information of User Equipment (UE) on the source eNB; and after receiving context information of the primary user-plane function from the source eNB, executing, by the target eNB, the primary user-plane function, wherein the source eNB is a user-plane primary eNB, and the target eNB is a Secondary eNB (SeNB);

a secondary user-plane function of the SeNB keeps being executed in a relocation process; and if the source eNB comprises the secondary user-plane function, the secondary user-plane function of the source eNB keeps being executed in the relocation process, wherein for an uplink radio bearer, the primary user-plane function comprises: reordering data packets sent from the UE and processed by the secondary user-plane function; and for a downlink radio bearer, the primary user-plane function comprises: numbering data packets from an upper-layer network; and the secondary user-plane function comprises one or more of the following functions: a security function, a Radio Link Control (RLC) protocol stack function, a Media Access Control (MAC) protocol stack function and a Physical (PHY) protocol stack function.

8. The method for performing cellular network relocation according to claim 7, wherein for the uplink radio bearer, the context information, sent to the target eNB by the source eNB, of the primary user-plane function comprises: context information of reordering of the data packets by the primary user-plane function; and for the downlink radio bearer, the context information, sent to the target eNB by the source eNB, of the primary user-plane function comprises: context information of numbering of the data packets by the primary user-plane function.

9. The method for performing cellular network relocation according to claim 8, wherein the step of, after receiving the context information of the primary user-plane function from the source eNB, executing, by the target eNB, the primary user-plane function comprises:
for the uplink radio bearer, after the context information of the primary user-plane function is received from the source eNB, reordering the data packets according to the context information of reordering, and sending the data packets to the upper-layer network in order; and/or,
for the downlink radio bearer, after the context information of the primary user-plane function is received from the source eNB, numbering the data packets, and sending the numbered data packets to the user-plane address of the eNB comprising the secondary user-plane function.

10. The method for performing cellular network relocation according to claim 7, wherein
the context information of the UE on the source eNB comprises at least one of: configuration information of the primary user-plane function, capability information of the UE, control-plane and user-plane address information of an upper-layer network, bearer configuration information sent to the source eNB by the upper-layer network and a user-plane address for the SeNB to receive data packets after relocation.

11. The method for performing cellular network relocation according to claim 7, wherein
for the uplink radio bearer, after the step of returning, by the target eNB, the relocation REQ ACK message to the source eNB, the method further comprises: locally caching data packets processed by the target eNB; and/or receiving data packets processed by the secondary user-plane function of another eNB.

12. The method for performing cellular network relocation according to claim 7, further comprising:
if a control-plane primary eNB after relocation is the target eNB, after the step of returning, by the target eNB to the source eNB, the relocation REQ ACK message configured to acknowledge that the eNB is the primary eNB after relocation, further initiating, by the target eNB, a route handoff process configured to notify the upper-layer network to handoff a route to the target eNB; and
if the control-plane primary eNB after relocation is another eNB, after the step of returning, by the target eNB to the source eNB, the relocation REQ ACK message configured to acknowledge that the eNB is the primary eNB after relocation, further notifying, by the target eNB, said another eNB to initiate the route handoff process configured to notify the upper-layer network to handoff the route to the target eNB.

13. A source evolved Node B (eNB) for performing cellular network relocation, comprising:
a memory storing processor-executable instructions; and
a processor arranged to execute the stored processor-executable instructions to perform steps of a method for performing cellular network relocation, the method comprising:
sending, by the source eNB to a target eNB for relocation, a relocation REQ message configured to instruct a target eNB to execute a primary user-plane function, wherein the relocation REQ message contains context information of User Equipment (UE) on the source eNB; and
after receiving a relocation REQ Acknowledgement (ACK) message returned by the target eNB and configured to acknowledge that the target eNB is a primary eNB after relocation, sending, by the source eNB, context information of the primary user-plane function on the eNB to the target eNB, and stopping executing the primary user-plane function, wherein the relocation REQ ACK message contains a user-plane address for the target eNB to receive data packets after relocation,
wherein the source eNB is a user-plane primary eNB, and the target eNB is a Secondary eNB (SeNB);
a secondary user-plane function of the SeNB keeps being executed in a relocation process; and if the source eNB comprises the secondary user-plane function, the secondary user-plane function of the source eNB keeps being executed in the relocation process,
wherein for an uplink radio bearer, the primary user-plane function comprises: reordering data packets sent from the UE and processed by the secondary user-plane function; and for a downlink radio bearer, the primary user-plane function comprises: numbering data packets from an upper-layer network; and
the secondary user-plane function comprises one or more of the following functions: a security function, a Radio Link Control (RLC) protocol stack function, a Media Access Control (MAC) protocol stack function and a Physical (PHY) protocol stack function.

14. The eNB for performing cellular network relocation according to claim 13, wherein
for the uplink radio bearer, the context information, sent to the target eNB by the source eNB, of the primary user-plane function comprises: context information of reordering of the data packets by the primary user-plane function; and
for the downlink radio bearer, the context information, sent to the target eNB by the source eNB, of the primary user-plane function comprises: context information of numbering of the data packets by the primary user-plane function.

15. The eNB for performing cellular network relocation according to claim 13, wherein the context information of the UE on the source eNB comprises at least one of:
configuration information of the primary user-plane function, capability information of the UE, control-plane and user-plane address information of an upper-layer network, bearer configuration information sent to the source eNB by the upper-layer network and a user-plane address for the SeNB to receive data packets after relocation,
wherein if the target eNB is a newly added eNB, the context information of the UE contained in the relocation REQ message sent to the target eNB by the source eNB further comprises: configuration information of the secondary user-plane function of the UE on the source eNB.

16. The eNB for performing cellular network relocation according to claim 15, wherein
if the target eNB is a newly added eNB, after receiving the relocation REQ ACK message sent by the target eNB, the method further comprises:
if a control-plane primary eNB before relocation is started is the eNB, initiating, by the source eNB, a Radio Resource Control (RRC) reconfiguration process between the ENB and the UE, and if the control-plane primary eNB before relocation is started is another eNB, notifying, by the source eNB said another eNB to initiate an RRC reconfiguration process between said another eNB and the UE, wherein in the RRC reconfiguration process, the UE is notified that the user-plane primary eNB is relocated from the source eNB to the target eNB, and configuration information of the secondary user-plane function of the target eNB is sent to the UE.

17. The eNB for performing cellular network relocation according to claim 13, wherein for the uplink radio bearer, after receiving the relocation REQ ACK message sent by the target eNB, the method further comprises: sending a relocation notification message to another SeNB other than the target eNB, the relocation notification message being configured to notify the primary eNB to be relocated from the source eNB to the target eNB and the relocation notification message containing the user-plane address for the target eNB to receive the data packets.

18. The eNB for performing cellular network relocation according to claim 13, wherein for the uplink radio bearer, after sending the context information of the primary user-plane function on the eNB to the target eNB, the method further comprises:

sending, to the target eNB, data packets processed by the secondary user-plane function of the eNB and/or received data packets processed by another SeNB; and, for the downlink radio bearer, after sending the context information of the primary user-plane function on the eNB to the target eNB, the method further comprises:

sending, to the target eNB, data packets sent from the upper-layer network and not yet numbered by the primary user-plane function, and/or locally cache data packets sent from the upper-layer network, numbered by the primary user-plane function but not yet sent to another SeNB other than the SeNB, processing the cached data packets using the secondary user-plane function on the eNB and sending the processed data packets to the UE.

19. A target evolved Node B (eNB) for performing cellular network relocation, comprising:

a memory storing processor-executable instructions; and a processor arranged to execute the stored processor-executable instructions to perform steps of the method for performing cellular network relocation according to claim 7.

\* \* \* \* \*